US011492107B2

(12) United States Patent
Thompson et al.

(10) Patent No.: US 11,492,107 B2
(45) Date of Patent: Nov. 8, 2022

(54) DUCTED PROPROTOR SYSTEMS HAVING ADAPTIVE DUCT GEOMETRIES

(71) Applicant: Textron Innovations Inc., Providence, RI (US)

(72) Inventors: George Matthew Thompson, Lewisville, TX (US); Bradley Joseph Passe, Irving, TX (US); Nicholas Ralph Carlson, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 222 days.

(21) Appl. No.: 16/935,751

(22) Filed: Jul. 22, 2020

(65) Prior Publication Data

US 2022/0024571 A1 Jan. 27, 2022

(51) Int. Cl.
*B64C 29/00* (2006.01)
*B64C 11/00* (2006.01)

(52) U.S. Cl.
CPC ........ *B64C 29/0033* (2013.01); *B64C 11/001* (2013.01)

(58) Field of Classification Search
CPC ... B64C 29/0033; B64C 11/001; B64C 27/20; B64C 2201/162; B64D 33/02; B64D 2033/0286; B64D 33/04; F02C 7/042
See application file for complete search history.

(56) References Cited

U.S. PATENT DOCUMENTS 5,035,377 A * 7/1991 Buchelt ................. B64C 11/001 416/223 R
8,636,246 B2 1/2014 Robertson et al.
8,640,984 B2 2/2014 Kebrle et al.
10,040,563 B1 * 8/2018 Pinto ...................... B64D 29/06
10,106,253 B2 10/2018 Groninga et al.
10,641,290 B1 * 5/2020 Piasecki ................ B64C 11/001
2011/0147533 A1 * 6/2011 Goossen ............... B64C 11/001 415/13
2018/0362160 A1 12/2018 Groninga et al.

* cited by examiner

*Primary Examiner* — Tien Q Dinh
*Assistant Examiner* — William L Gmoser
(74) *Attorney, Agent, or Firm* — Lawrence Youst PLLC

(57) ABSTRACT

A proprotor system for a ducted aircraft convertible between a vertical takeoff and landing flight mode and a forward flight mode includes a plurality of proprotor blades and a duct surrounding the proprotor blades. The duct includes an adaptive geometry device movable into various positions including a hover position and a cruise position. One or more actuators coupled to the adaptive geometry device are configured to move the adaptive geometry device between the hover position and the cruise position based on the flight mode of the ducted aircraft, thereby improving flight performance of the ducted aircraft.

19 Claims, 18 Drawing Sheets

DUCTED PROPROTOR SYSTEMS HAVING ADAPTIVE DUCT GEOMETRIES

TECHNICAL FIELD OF THE DISCLOSURE

The present disclosure relates, in general, to aircraft having ducted rotor systems and, in particular, to proprotor systems having a duct with one or more adaptive geometry devices to alter the shape of the duct for enhanced performance in all flight modes of the ducted aircraft.

BACKGROUND

Ducted rotor systems offer several benefits over open rotor systems in which the rotor blades are exposed. For example, ducted rotor systems emit less noise and are therefore preferred when a reduced noise environment is desired, such as during air reconnaissance, clandestine operations or flight in urban airspace. Ducts increase safety for ground personnel and crew by preventing contact with an operating rotor. Openly exposed rotors can lead to blade tip thrust losses during flight. By reducing rotor blade tip losses, a ducted rotor system is more efficient in producing thrust than an open rotor system of similar diameter, especially at low speed and high static thrust levels. Also, the thrust vectoring capabilities of open rotor systems are limited as is the use of pressure differentials to augment thrust.

Ducted proprotor systems may be implemented on aircraft that convert between a vertical takeoff and landing (VTOL) flight mode in which the ducted proprotor system is in a generally horizontal orientation and provides thrust-borne lift and a forward flight mode in which the ducted proprotor system is in a generally vertical orientation and provides forward thrust to enable wing-borne lift. The performance of the ducted proprotor system in each of these flight modes is sensitive to the shape of the duct. For example, performance while hovering in the VTOL flight mode is generally improved using a duct with a larger inner lip radius, duct chord length and diffusion angle. Utilizing a duct with a larger inner lip radius, duct chord length and diffusion angle, however, can add an undesirable drag penalty in forward flight mode. Current ducted aircraft include ducts that have a static shape in all flight modes of the aircraft, leading to performance compromises in each flight mode. Accordingly, a need has arisen for proprotor systems having ducts with adaptive geometry to improve performance in all flight modes of the ducted aircraft.

SUMMARY

In a first aspect, the present disclosure is directed to a proprotor system for a ducted aircraft convertible between a vertical takeoff and landing flight mode and a forward flight mode. The proprotor system includes a plurality of proprotor blades and a duct surrounding the proprotor blades. The duct includes an adaptive geometry device movable into various positions including a hover position and a cruise position. One or more actuators coupled to the adaptive geometry device are configured to move the adaptive geometry device between the hover position and the cruise position based on the flight mode of the ducted aircraft, thereby improving flight performance of the ducted aircraft.

In some embodiments, movement of the adaptive geometry device between the hover position and the cruise position may change the shape of the duct. In certain embodiments, the adaptive geometry device may include a leading edge adaptive geometry device coupled to a leading edge of the duct. In some embodiments, the leading edge adaptive geometry device may include hinged noses rotatably coupled to the leading edge of the duct. The hinged noses may be substantially in chordwise alignment with the duct in the cruise position and tilted radially outward to increase a leading edge inner lip radius of the duct in the hover position. In certain embodiments, the leading edge adaptive geometry device may include Krueger flaps rotatably coupled to the leading edge of the duct. The Krueger flaps may be retracted against an outer surface of the duct in the cruise position and extended radially outward to increase a leading edge inner lip radius of the duct in the hover position.

In some embodiments, the adaptive geometry device may include a trailing edge adaptive geometry device coupled to a trailing edge of the duct. In such embodiments, the trailing edge adaptive geometry device may include plain flaps rotatably coupled to the trailing edge of the duct. The plain flaps may be substantially in chordwise alignment with the duct in the cruise position and tilted radially outward to increase a diffusion angle of the duct in the hover position. In certain embodiments, the trailing edge adaptive geometry device may include Fowler flaps slidably coupled to the trailing edge of the duct. The Fowler flaps may be retracted against an inner surface of the duct in the cruise position and extended aftward and radially outward to increase a diffusion angle of the duct in the hover position. In some embodiments, the adaptive geometry device may include an intermediate adaptive geometry device disposed between leading and trailing edges of the duct. In such embodiments, the duct may include tail extensions and a forward duct airframe and the intermediate adaptive geometry device may include elongating adaptive geometry devices slidably coupling the tail extensions to the forward duct airframe. Also in such embodiments, the elongating adaptive geometry devices may extend the tail extensions in an aft direction in the hover position and may retract the tail extensions toward the forward duct airframe in the cruise position.

In certain embodiments, the adaptive geometry device may include a plurality of adaptive geometry devices circumferentially disposed around a circumference of the duct. In some embodiments, the adaptive geometry device may include a plurality of adaptive geometry devices and the one or more actuators may include a plurality of actuators, each actuator coupled to a respective one of the adaptive geometry devices. In certain embodiments, the one or more actuators may move the adaptive geometry device into the hover position in the vertical takeoff and landing flight mode and the cruise position in the forward flight mode.

In a second aspect, the present disclosure is directed to a ducted aircraft including a fuselage and a proprotor system coupled to the fuselage. The proprotor system includes proprotor blades and a duct surrounding the proprotor blades. The duct includes an adaptive geometry device movable into various positions including a hover position and a cruise position. The proprotor system also includes one or more actuators coupled to the adaptive geometry device. The ducted aircraft is convertible between a vertical takeoff and landing flight mode and a forward flight mode. The one or more actuators are configured to move the adaptive geometry device between the hover position and the cruise position based on the flight mode of the ducted aircraft, thereby improving flight performance of the ducted aircraft.

In some embodiments, the duct may have a leading edge inner lip radius R when the adaptive geometry device is in the hover position and a leading edge inner lip radius r when the adaptive geometry device is in the cruise position, wherein R>r. In certain embodiments, the duct may have a chord length L when the adaptive geometry device is in the hover position and a chord length l when the adaptive geometry device is in the cruise position, wherein L>l. In some embodiments, the duct may have a diffusion angle A when the adaptive geometry device is in the hover position and a diffusion angle α when the adaptive geometry device is in the cruise position, where A>α. In certain embodiments, the duct may have a thickness T when the adaptive geometry device is in the hover position and a thickness t when the adaptive geometry device is in the cruise position, where T>t. In some embodiments, the ducted aircraft may include a flight control computer. The flight control computer may include a duct geometry controller configured to detect the flight mode of the ducted aircraft and send one or more commands to the one or more actuators to move the adaptive geometry device based on the flight mode of the ducted aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
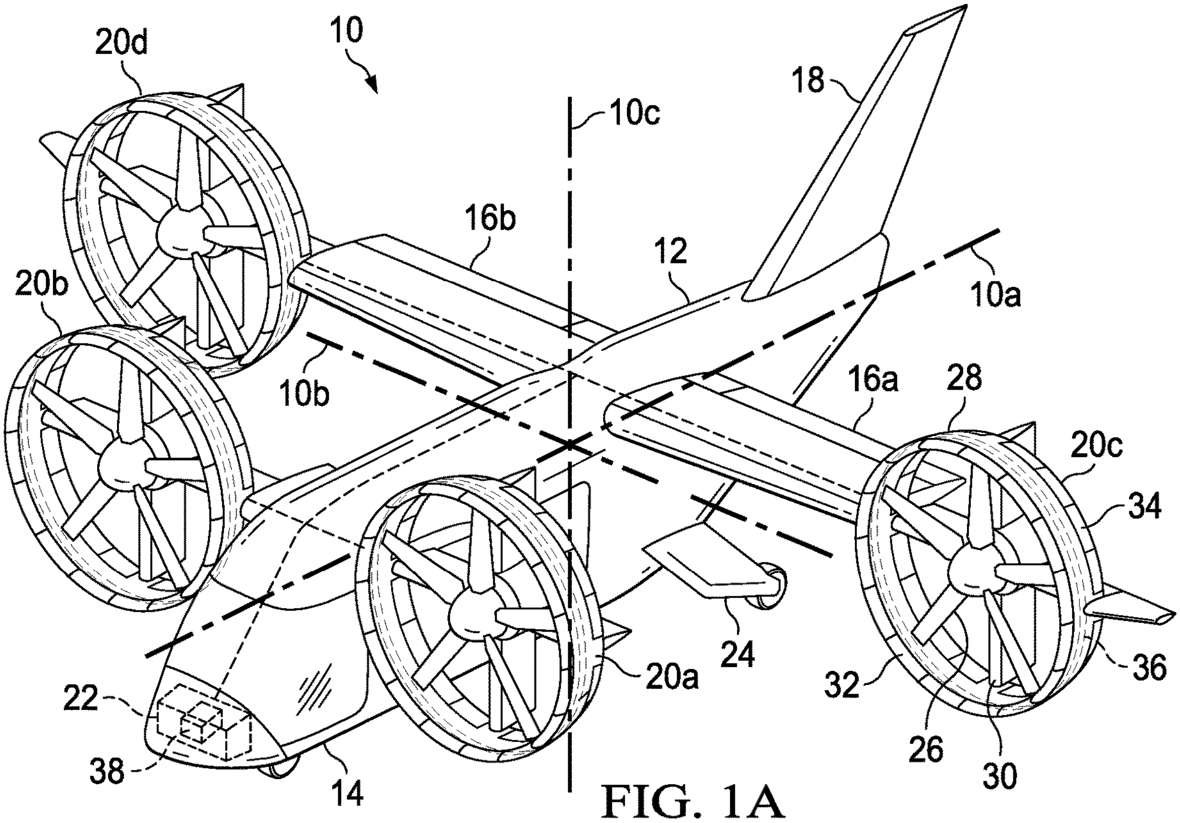
FIGS. 1A-1F are schematic illustrations of a ducted aircraft with ducts having adaptive geometry devices in accordance with embodiments of the present disclosure.
Figure 1B:
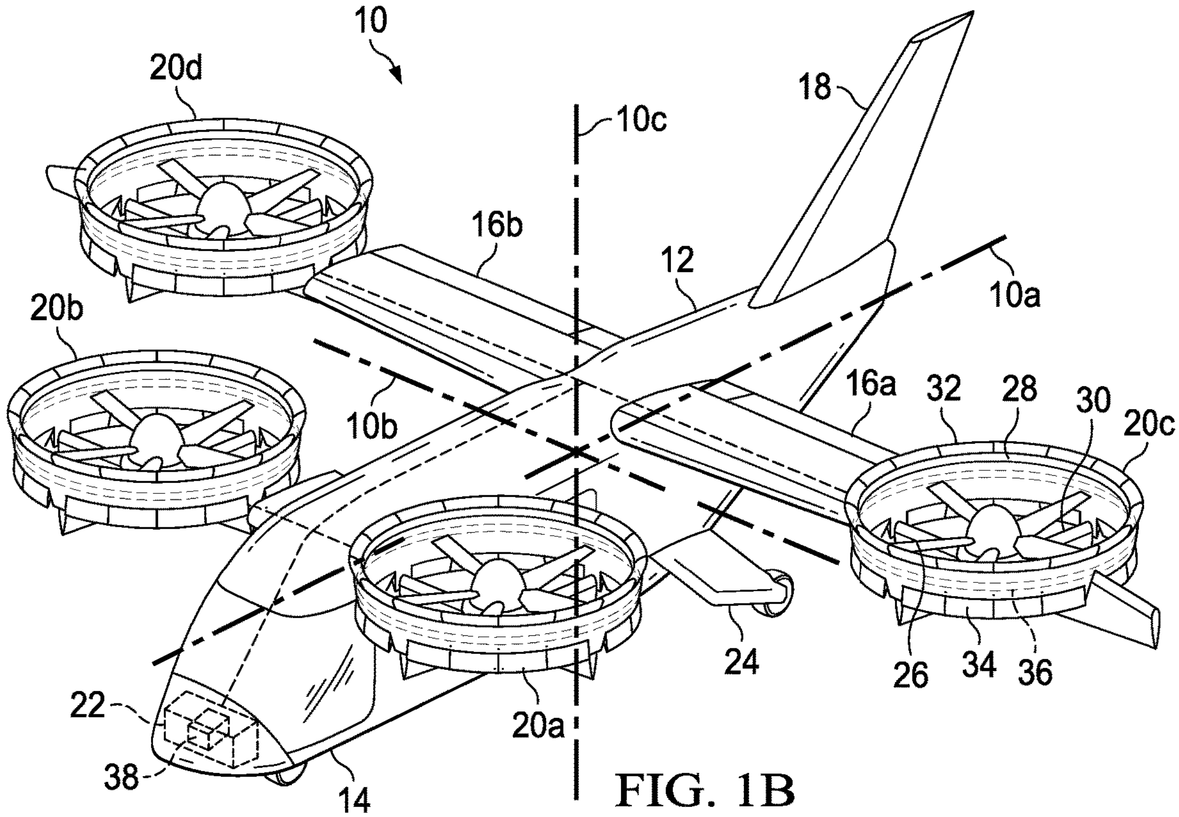
Figure 1C:
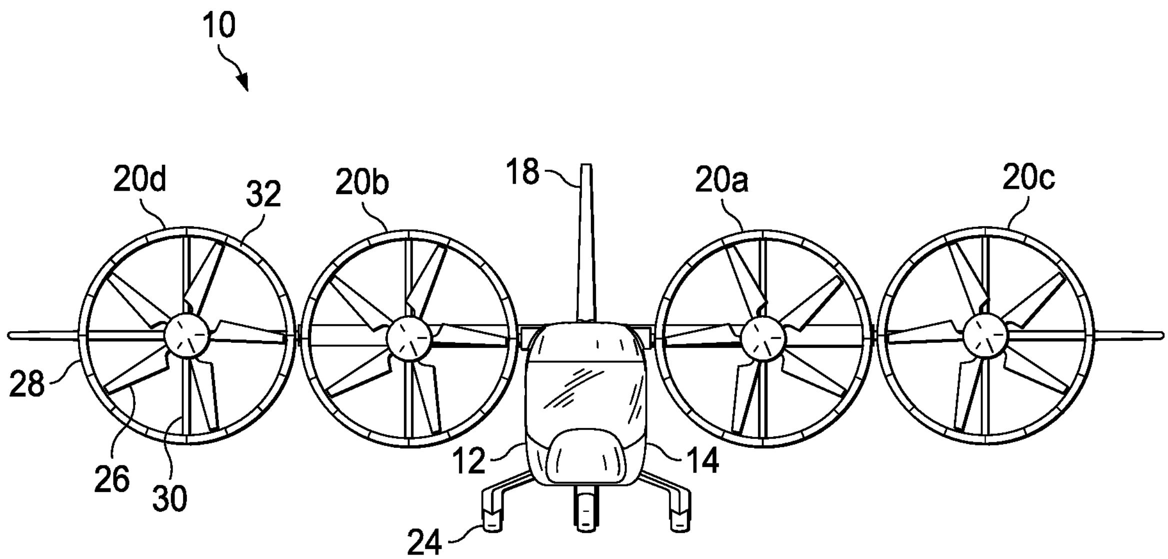
Figure 1D:
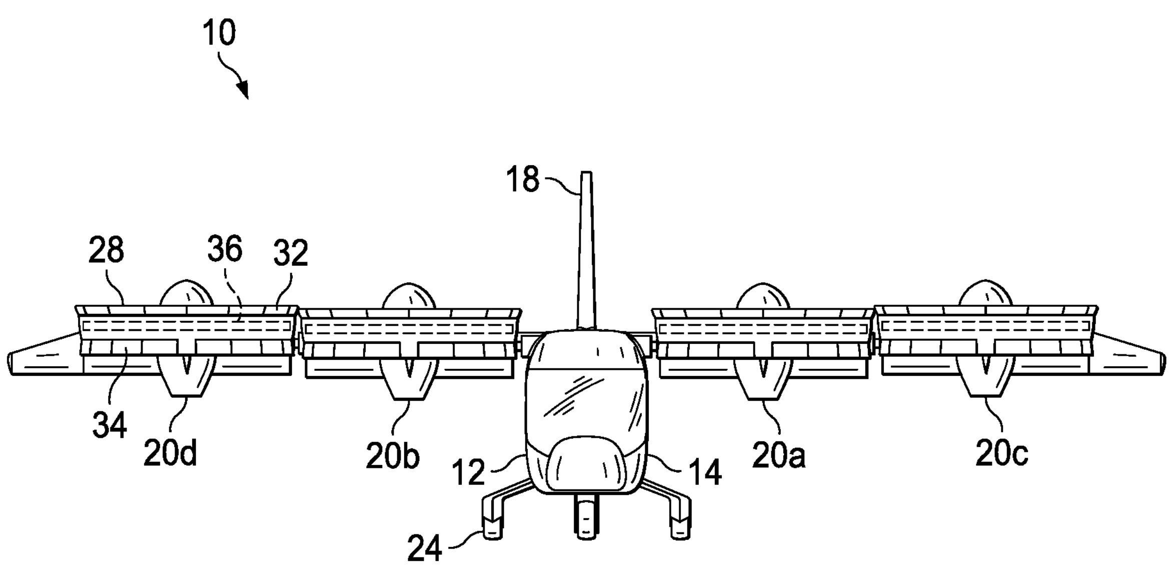
Figure 1E:
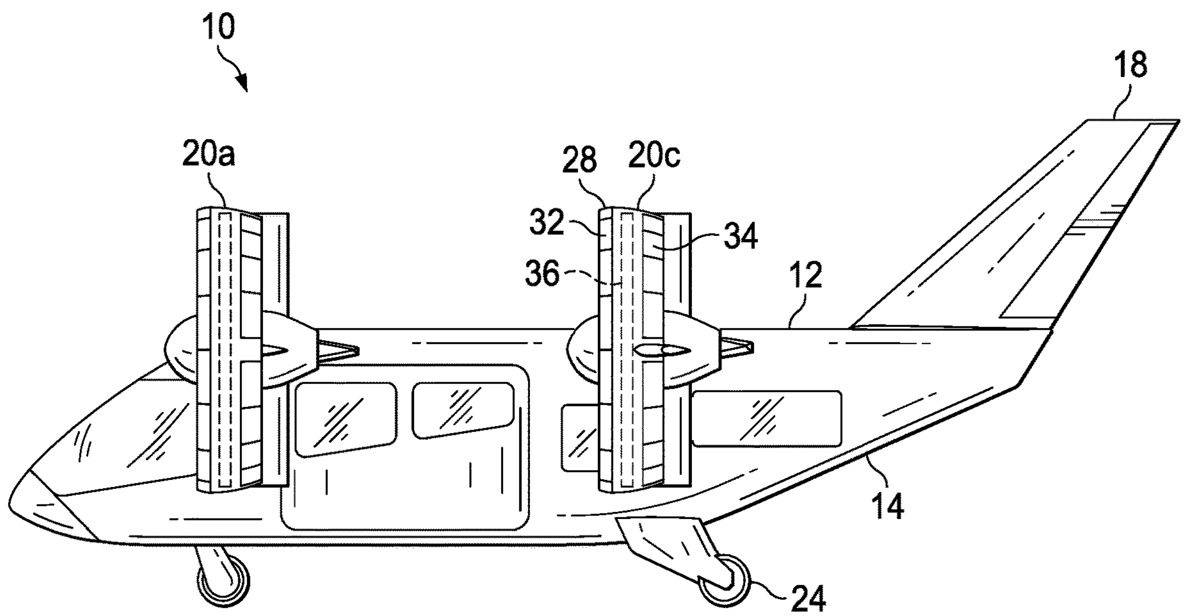
Figure 1F:
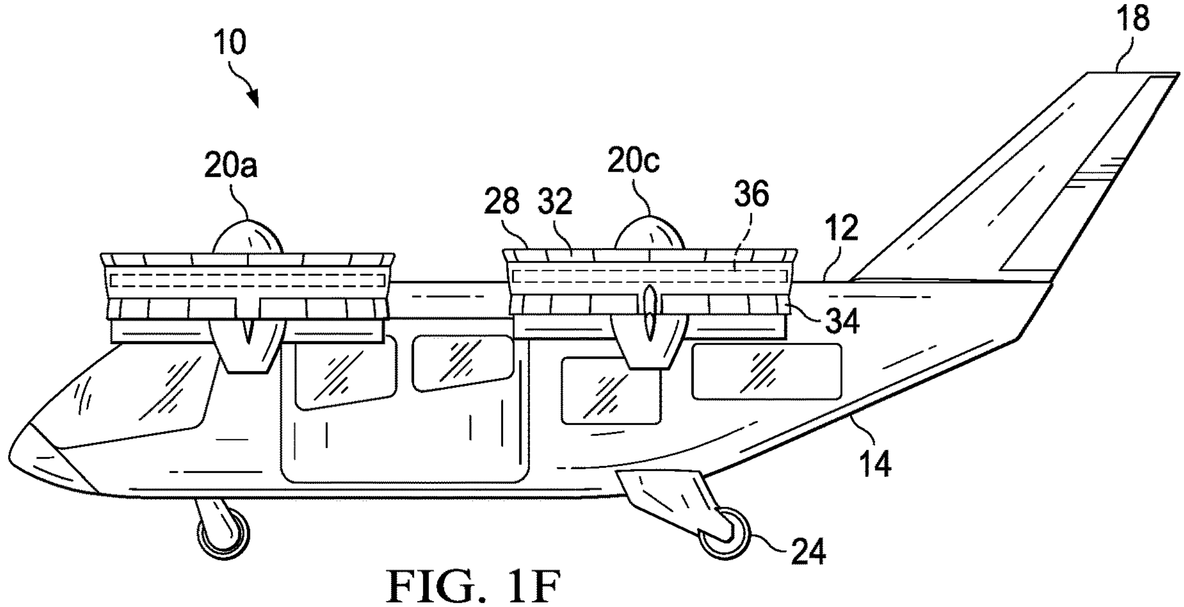

Referring to FIGS. 1A-1F in the drawings, various views of a ducted aircraft 10 having ducts with adaptive geometry are depicted. FIGS. 1B, 1D and 1F depict ducted aircraft 10 in a vertical takeoff and landing (VTOL) flight mode wherein the proprotor systems provide thrust-borne lift. FIGS. 1A, 1C and 1E depict ducted aircraft 10 in a forward flight mode wherein the proprotor systems provide forward thrust with the forward airspeed of ducted aircraft 10 providing wing-borne lift, thereby enabling ducted aircraft 10 to have a high speed and/or high endurance forward flight mode. Ducted aircraft 10 has a longitudinal axis 10*a* that may also be referred to as the roll axis, a lateral axis 10*b* that may also be referred to as the pitch axis and a vertical axis 10*c* that may also be referred to as the yaw axis, as best seen in FIGS. 1A-1B. As illustrated, when longitudinal axis 10*a* and lateral axis 10*b* are both in a horizontal plane that is normal to the local vertical in the earth's reference frame, ducted aircraft 10 has a level flight attitude.

In the illustrated embodiment, ducted aircraft 10 has an airframe 12 including a fuselage 14, wings 16*a*, 16*b* and a tail assembly 18. Wings 16*a*, 16*b* have an airfoil cross-section that generates lift responsive to the forward airspeed of ducted aircraft 10. In the illustrated embodiment, wings 16*a*, 16*b* are straight wings with a tapered leading edge. It will be appreciated, however, that wings 16*a*, 16*b* may be of a wide variety of shapes, sizes and configurations, depending upon the performance characteristics desired. In the illustrated embodiment, wings 16*a*, 16*b* include ailerons to aid in roll and/or pitch control of ducted aircraft 10 during forward flight. Tail assembly 18 is depicted as a vertical fin, or stabilizer, that may include one or more rudders to control the yaw of ducted aircraft 10 during forward flight. In other embodiments, tail assembly 18 may have two or more vertical fins and/or a horizontal stabilizer that may include one or more elevators to control the pitch of ducted aircraft 10 during forward flight. It will be appreciated, however, that tail assembly 18 may be of a wide variety of shapes, sizes and configurations, depending upon the performance characteristics desired.

In the illustrated embodiment, ducted aircraft 10 includes four proprotor systems forming a two-dimensional distributed thrust array that is coupled to airframe 12. As used herein, the term "two-dimensional thrust array" refers to a plurality of thrust generating elements that occupy a two-dimensional space in the form of a plane. As used herein, the term "distributed thrust array" refers to the use of multiple thrust generating elements, each producing a portion of the total thrust output. The thrust array of ducted aircraft 10 includes a forward-port proprotor system 20*a*, a forward-starboard proprotor system 20*b*, an aft-port proprotor system 20*c* and an aft-starboard proprotor system 20*d*, which may be referred to collectively as proprotor systems 20. Forward-port proprotor system 20*a* and forward-starboard proprotor system 20*b* are each rotatably mounted to a shoulder portion of fuselage 14 at a forward station thereof. Aft-port proprotor system 20*c* is rotatably mounted on the outboard end of wing 16*a*. Aft-starboard proprotor system 20*d* is rotatably mounted on the outboard end of wing 16*b*. Proprotor systems 20 may each include at least one variable speed electric motor and a speed controller configured to provide variable speed control to the proprotor assembly over a wide range of rotor speeds.

When ducted aircraft 10 is operating in the VTOL flight mode and supported by thrust-borne lift, proprotor systems 20 each have a generally horizontal position such that the proprotor assemblies are rotating in generally the same horizontal plane, as best seen in FIGS. 1D and 1F. When ducted aircraft 10 is operating in the forward flight mode and supported by wing-borne lift, proprotor systems 20 each have a generally vertical position with the forward proprotor assemblies rotating generally in a forward vertical plane and the aft proprotor assemblies rotating generally in an aft vertical plane, as best seen in FIG. 1E. Transitions between the VTOL flight mode and the forward flight mode of ducted aircraft 10 are achieved by changing the angular positions of proprotor systems 20 between their generally horizontal positions and their generally vertical positions as discussed herein.

Ducted aircraft 10 may include a liquid fuel powered turbo-generator that includes a gas turbine engine and an electric generator. Preferably, the electric generator charges an array of batteries that provides power to the electric motors of proprotor systems 20 via a power management system. In other embodiments, the turbo-generator may provide power directly to the power management system and/or the electric motors of proprotor systems 20. In yet other embodiments, proprotor systems 20 may be mechanically driven by the power plant of ducted aircraft 10 via suitable gearing, shafting and clutching systems.

Ducted aircraft 10 has a fly-by-wire control system that includes a flight control computer 22 that is preferably a redundant digital flight control system including multiple independent flight control computers. Flight control computer 22 preferably includes non-transitory computer readable storage media including a set of computer instructions executable by one or more processors for controlling the operation of ducted aircraft 10. Flight control computer 22 may be implemented on one or more general-purpose computers, special purpose computers or other machines with memory and processing capability. Flight control computer 22 may include one or more memory storage modules including random access memory, non-volatile memory, removable memory or other suitable memory. Flight control computer 22 may be a microprocessor-based system operable to execute program code in the form of machine-executable instructions. Flight control computer 22 may be connected to other computer systems via a suitable communications network that may include both wired and wireless connections.

Flight control computer 22 communicates via a wired communications network within airframe 12 with the electronics nodes of each proprotor system 20. Flight control computer 22 receives sensor data from and sends flight command information to proprotor systems 20 such that each proprotor system 20 may be individually and independently controlled and operated. For example, flight control computer 22 is operable to individually and independently control the proprotor speed and collective blade pitch of each proprotor system 20 as well as the angular position of each proprotor system 20. Flight control computer 22 may autonomously control some or all aspects of flight operation for ducted aircraft 10. Flight control computer 22 is also operable to communicate with remote systems, such as a ground station via a wireless communications protocol. The remote system may be operable to receive flight data from and provide commands to flight control computer 22 to enable remote flight control over some or all aspects of flight operation for ducted aircraft 10. In addition, ducted aircraft 10 may be pilot operated such that a pilot interacts with a pilot interface that receives flight data from and provides commands to flight control computer 22 to enable onboard pilot control over some or all aspects of flight operation for ducted aircraft 10.

Ducted aircraft 10 includes landing gear 24 for ground operations. Landing gear 24 may include passively operated pneumatic landing struts or actively operated landing struts. In the illustrated embodiment, landing gear 24 includes a plurality of wheels that enable ducted aircraft 10 to taxi and perform other ground maneuvers. Landing gear 24 may include a passive brake system, an active brake system such as an electromechanical braking system and/or a manual brake system to facilitate parking as required during ground operations and/or passenger ingress and egress.

In the illustrated embodiment, proprotor systems 20 are ducted proprotor systems each having a five bladed proprotor assembly with variable pitch proprotor blades 26 operable for collective pitch control. In other embodiments, the number of proprotor blades could be either greater than or less than five and/or the proprotor blades could have a fixed pitch. Proprotor blades 26 of each proprotor system 20 are surrounded by a duct 28, which is supported by stators 30. Duct 28 and stators 30 may be formed from metallic, composite, carbon-based or other sufficiently rigid materials. The inclusion of duct 28 on each proprotor system 20 offers several benefits over open proprotor systems having exposed proprotor blades. For example, proprotor systems 20 emit less noise and are therefore preferred when a reduced noise environment is desired, such as during air reconnaissance, clandestine operations or flight in urban airspace. Ducts 28 increase safety for ground personnel and crew by preventing inadvertent collisions with a spinning proprotor. Openly exposed proprotors can lead to blade tip thrust losses during flight. By reducing proprotor blade tip losses, ducted proprotor systems 20 are more efficient in producing thrust than open proprotor systems of similar diameter, especially at low speed and high static thrust levels. Also, the thrust vectoring capabilities of open rotor systems are limited as is the use of pressure differentials to augment thrust.

The performance of proprotor systems 20 in each flight mode is sensitive to the shape, or profile, of each duct 28. For example, while hovering in the VTOL flight mode, ducts 28 increase the pressure ratio across the rotor plane of each proprotor system 20 to reduce the overall power required to hover. Accordingly, performance while hovering in the VTOL flight mode is generally improved using ducts 28 with a larger inner lip radius, duct chord length and diffusion angle. Conversely, cruise efficiency in the forward flight mode favors a small and thin duct shape to reduce drag. Thus, the duct geometry of a larger inner lip radius, duct chord length and diffusion angle that favors efficiency in the VTOL flight mode is detrimental to cruise efficiency in the forward flight mode. A duct having a static and unchangeable shape, such as those used in previous aircraft, will exhibit degraded performance in some or all flight modes since each flight mode favors different duct geometries.

To remedy this issue, ducts 28 change shape based on the flight mode of ducted aircraft 10 to maximize effectiveness in the VTOL flight mode while minimizing penalties in the forward flight mode. In particular, each duct 28 includes adaptive geometry devices 32, 34, 36 that change the shape of ducts 28 based on the flight mode of ducted aircraft 10. One or more actuators (not shown) move adaptive geometry devices 32, 34, 36 into a hover position when ducted aircraft 10 is in the VTOL flight mode shown in FIGS. 1B, 1D and 1F to increase the leading edge inner lip radius, chord length and/or diffusion angle of ducts 28 for more efficient hover performance. The actuators also move adaptive geometry devices 32, 34, 36 into a cruise position in the forward flight mode shown in FIGS. 1A, 1C and 1E to decrease the leading edge inner lip radius, chord length, diffusion angle and/or thickness of ducts 28 for reduced drag and more efficient cruise performance.

The adaptive geometry devices include leading edge adaptive geometry devices 32 coupled to the leading edge of each duct 28, trailing edge adaptive geometry devices 34 coupled to the trailing edge of each duct 28 and intermediate adaptive geometry devices 36 disposed between the leading and trailing edges of each duct 28. Adaptive geometry devices 32, 34, 36 are segmented and circumferentially disposed around each duct 28. The number of adaptive geometry devices 32, 34, 36 around the circumference of each duct 28 varies depending on a number of factors such as the size of proprotor systems 20 or the number of proprotor blades 26 or stators 30 present on each proprotor system 20. For example, each duct 28 may include 2, 4, 5, 20, 100 or 200 leading edge, trailing edge or intermediate adaptive geometry devices 32, 34, 36 around the circumference of each duct 28. In other embodiments, leading edge, trailing edge or intermediate adaptive geometry devices 32, 34, 36 may each form a single monolithic adaptive geometry device that fully or partially wraps around the circumference of each duct 28. For example, leading edge adaptive geometry devices 32 may be a single monolithic adaptive geometry device capable of changing the shape of each duct 28. Any combination of leading edge, trailing edge or intermediate adaptive geometry devices 32, 34, 36 may be used for each duct 28. For example, only leading edge and trailing edge adaptive geometry devices 32, 34 may be used on each duct 28. In yet another example, only leading edge adaptive geometry devices 32, only trailing edge adaptive geometry devices 34 or only intermediate adaptive geometry devices 36 may be used on each duct 28. Adaptive geometry devices 32, 34, 36 may be manufactured using any additive, subtractive or formative manufacturing technique including, but not limited to, extrusion, machining, 3D printing, laser cutting, stamping, welding or casting as well as others. The actuators that move adaptive geometry devices 32, 34, 36 between the hover and cruise positions may be controlled by a duct geometry controller 38, which may detect the flight mode of ducted aircraft 10 and send one or more commands to the actuators to move adaptive geometry devices 32, 34, 36 based on the flight mode of ducted aircraft 10.

It should be appreciated that ducted aircraft 10 is merely illustrative of a variety of aircraft that can implement the embodiments disclosed herein. Indeed, adaptive geometry devices 32, 34, 36 may be implemented on any aircraft that utilizes one or more ducts. Other aircraft implementations can include hybrid aircraft, tiltwing aircraft, unmanned aircraft, gyrocopters, propeller-driven airplanes, quadcopters, compound helicopters, jets, drones and the like. While many of the illustrative embodiments are described herein as being implemented on ducted proprotors, the illustrative embodiments may also be implemented on ducted rotors such as those present on helicopters or quadcopters. Adaptive geometry devices 32, 34, 36 may also be implemented on ducted tail rotors or anti-torque systems. As such, those skilled in the art will recognize that adaptive geometry devices 32, 34, 36 can be integrated into a variety of aircraft configurations. It should be appreciated that even though aircraft are particularly well-suited to implement the embodiments of the present disclosure, non-aircraft vehicles and devices can also implement the embodiments.

Figure 2:
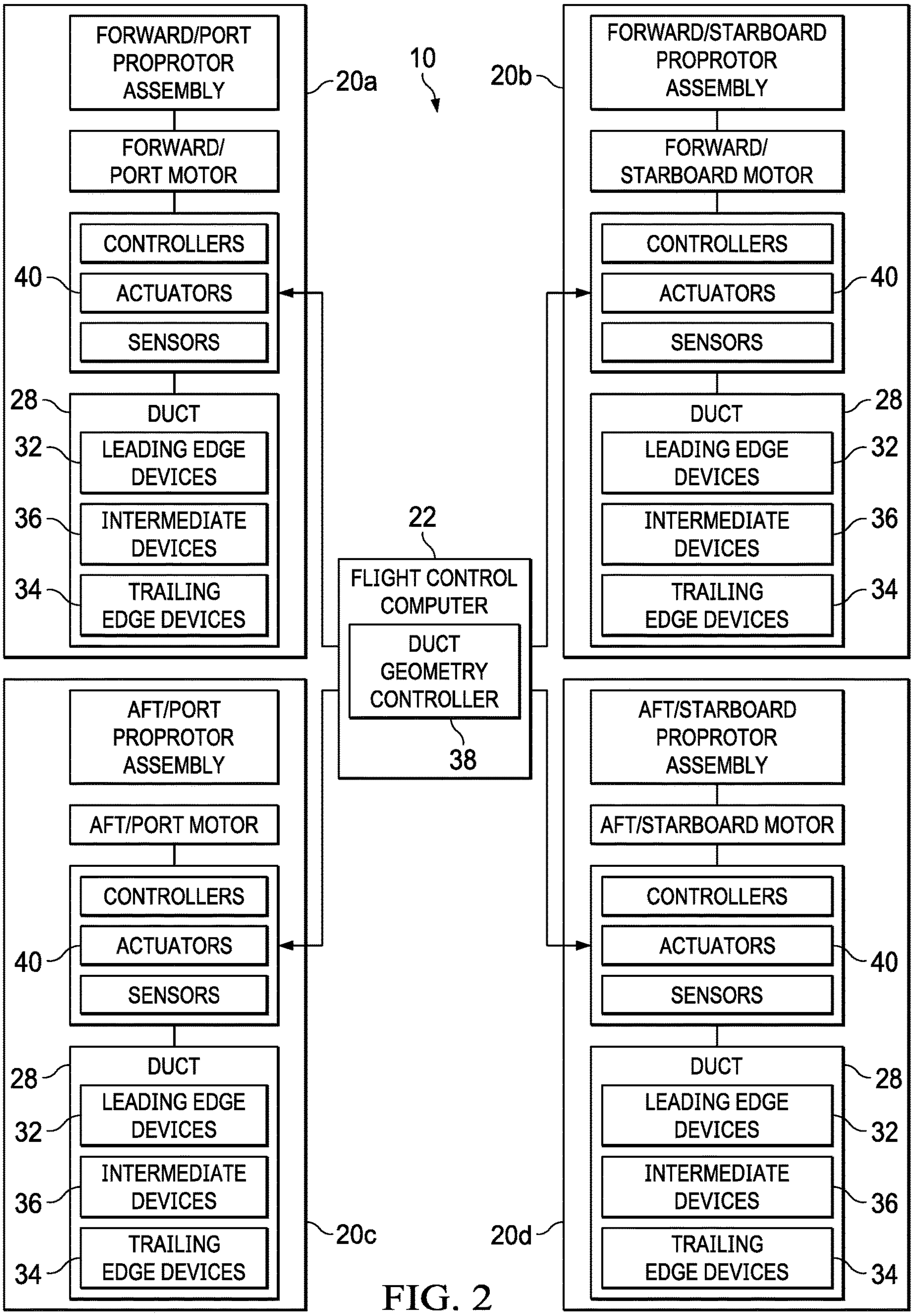
FIG. 2 is a block diagram of a propulsion and control system for a ducted aircraft with ducts having adaptive geometry devices in accordance with embodiments of the present disclosure.
Figure 3:
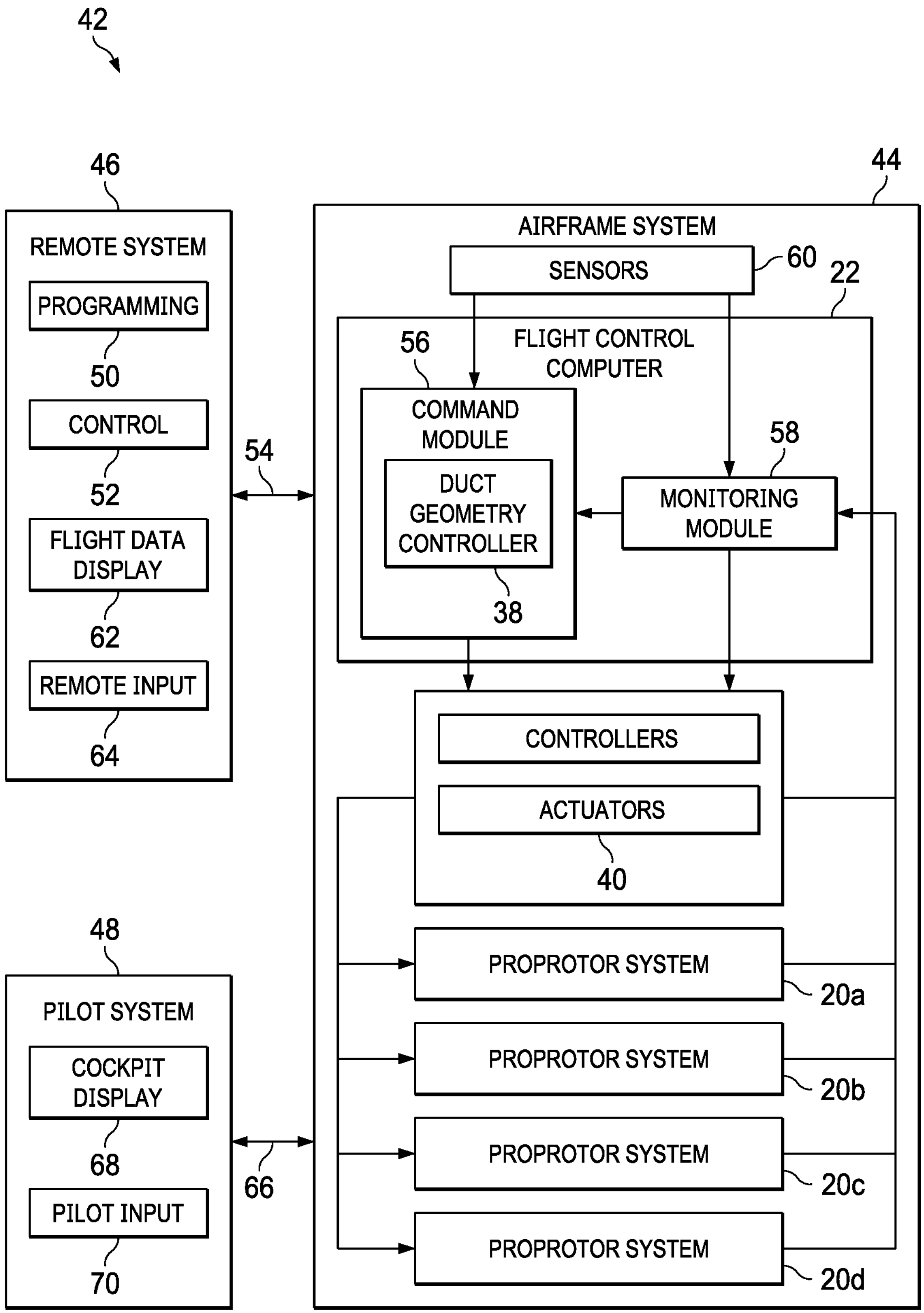
FIG. 3 is a block diagram of a control system for a ducted aircraft with ducts having adaptive geometry devices in accordance with embodiments of the present disclosure.

Referring additionally to FIG. 2 in the drawings, various systems of ducted aircraft 10 with ducts 28 including adaptive geometry devices 32, 34, 36 are depicted. As discussed herein, ducted aircraft 10 includes flight control computer 22 and a two-dimensional distributed thrust array depicted as forward-port proprotor system 20*a*, forward-starboard proprotor system 20*b*, aft-port proprotor system 20*c* and aft-starboard proprotor system 20*d*. Each proprotor system 20 includes an electronics node depicted as having one or more controllers such as an electronic speed controller, one or more sensors and one or more actuators 40 such as a rotor system position actuator and/or a blade pitch actuator. Actuators 40 includes actuators to move adaptive geometry devices 32, 34, 36 between the hover and cruise positions. Each proprotor system 20 also includes at least one variable speed electric motor and a proprotor assembly including proprotor blades coupled to the output drive of the electric motor. Duct geometry controller 38 implemented by flight control computer 22 detects the flight mode of ducted aircraft 10 and sends commands to actuators 40 to move adaptive geometry devices 32, 34, 36 to change the shape of ducts 28 based on the flight mode of ducted aircraft 10. More particularly, duct geometry controller 38 sends commands to actuators 40 to move adaptive geometry devices 32, 34, 36 into the hover position when ducted aircraft 10 is in the VTOL flight mode. Duct geometry controller 38 also sends commands to actuators 40 to move adaptive geometry devices 32, 34, 36 into the cruise position when ducted aircraft 10 is in the forward flight mode Referring additionally to FIG. 3 in the drawings, a block diagram depicts a control system 42 operable for use with ducted aircraft 10 of the present disclosure. In the illustrated embodiment, control system 42 includes three primary computer based subsystems; namely, an airframe system 44, a remote system 46 and a pilot system 48. In some implementations, remote system 46 includes a programming application 50 and a remote control application 52. Programming application 50 enables a user to provide a flight plan and mission information to ducted aircraft 10 such that flight control computer 22 may engage in autonomous control over ducted aircraft 10. For example, programming application 50 may communicate with flight control computer 22 over a wired and/or wireless communication channel 54 to provide a flight plan including, for example, a starting point, a trail of waypoints and an ending point such that flight control computer 22 may use waypoint navigation during the mission.

In the illustrated embodiment, flight control computer 22 is a computer based system that includes a command module 56 and a monitoring module 58. It is to be understood by those skilled in the art that these and other modules executed by flight control computer 22 may be implemented in a variety of forms including hardware, software, firmware, special purpose processors and combinations thereof. Flight control computer 22 receives input from a variety of sources including internal sources such as sensors 60, controllers and actuators 40 and proprotor systems 20*a*-20*d* and external sources such as remote system 46 as well as global positioning system satellites or other location positioning systems and the like. During the various operating modes of ducted aircraft 10 including the VTOL flight mode, the forward flight mode and transitions therebetween, command module 56, which includes duct geometry controller 38, provides commands to controllers and actuators 40. These commands enable independent operation of each proprotor system 20*a*-20*d* including duct shape adjustment, rotor speed and angular position. Flight control computer 22 receives feedback and sensor measurements from sensors 60, controllers, actuators 40 and proprotor systems 20*a*-20*d*. This feedback is processed by monitoring module 58, which can supply correction data and other information to command module 56 and/or controllers and actuators 40. Sensors 60, such as strain sensors, distance sensors, accelerometers, vibration sensors, location sensors, attitude sensors, speed sensors, environmental sensors, fuel sensors, temperature sensors and the like also provide information to flight control computer 22 to further enhance autonomous control capabilities.

Some or all of the autonomous control capability of flight control computer 22 can be augmented or supplanted by remote flight control from, for example, remote system 46. Remote system 46 may include one or more computing systems that may be implemented on general-purpose computers, special purpose computers or other machines with memory and processing capability. Remote system 46 may be a microprocessor-based system operable to execute program code in the form of machine-executable instructions. In addition, remote system 46 may be connected to other computer systems via a proprietary encrypted network, a public encrypted network, the Internet or other suitable communication network that may include both wired and wireless connections. Remote system 46 communicates with flight control computer 22 via communication channel 54 that may include wired and/or wireless connections.

While operating remote control application 52, remote system 46 is configured to display information relating to one or more aircraft of the present disclosure on one or more flight data display devices 62. Remote system 46 may also include audio output and input devices such as a microphone, speakers and/or an audio port allowing an operator to communicate with other operators, a base station and/or a pilot onboard ducted aircraft 10. Display device 62 may also serve as a remote input device 64 if a touch screen display implementation is used, although other remote input devices such as a keyboard or joystick may alternatively be used to allow an operator to provide control commands to an aircraft being operated responsive to remote control.

Some or all of the autonomous and/or remote flight control of ducted aircraft 10 can be augmented or supplanted by onboard pilot flight control from a pilot interface system 48 that includes one or more computing systems that communicate with flight control computer 22 via one or more wired communication channels 66. Pilot system 48 preferably includes one or more cockpit display devices 68 configured to display information to the pilot. Cockpit display device 68 may be configured in any suitable form including, for example, a display panel, a dashboard display, an augmented reality display or the like. Pilot system 48 may also include audio output and input devices such as a microphone, speakers and/or an audio port allowing an onboard pilot to communicate with, for example, air traffic control. Pilot system 48 also includes a plurality of user interface devices 70 to allow an onboard pilot to provide control commands to ducted aircraft 10 including, for example, a control panel with switches or other inputs, mechanical control devices such as steering devices or sticks, voice control as well as other control devices.

Figure 4D:
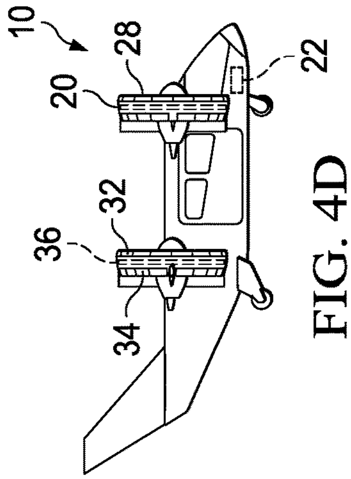
FIGS. 4A-4H are schematic illustrations of a ducted aircraft with ducts having adaptive geometry devices in a sequential flight operating scenario in accordance with embodiments of the present disclosure.
Figure 4C:
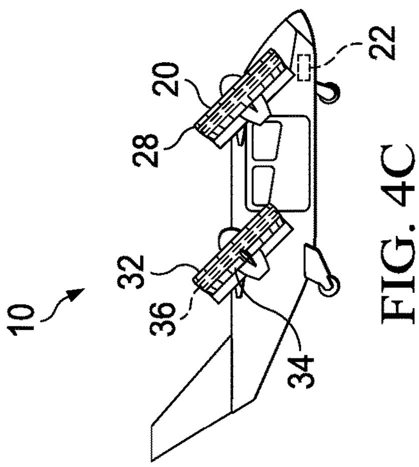
Figure 4B:
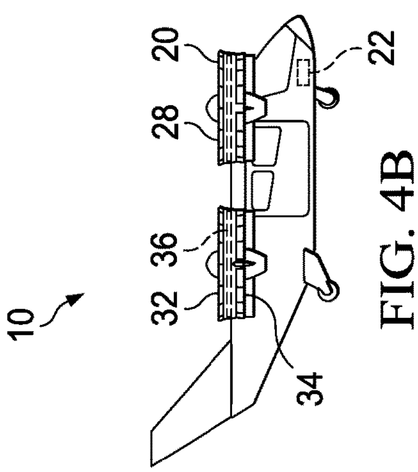
Figure 4A:
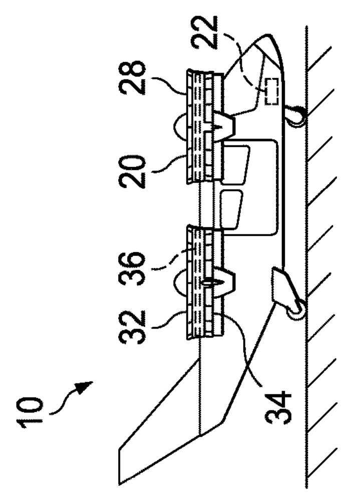

Referring additionally to FIGS. 4A-4H in the drawings, a sequential flight-operating scenario of ducted aircraft 10 including proprotor systems 20 and flight control computer 22 is depicted. Proprotor systems 20 include forward-port, forward-starboard, aft-port and aft-starboard proprotor systems. As best seen in FIG. 4A, ducted aircraft 10 is positioned on the ground prior to takeoff. When ducted aircraft 10 is ready for a mission, flight control computer 22 commences operations to provide flight control to ducted aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

As best seen in FIG. 4B, ducted aircraft 10 has performed a vertical takeoff and is engaged in thrust-borne lift. As illustrated, the proprotor assemblies of each proprotor system 20 are rotating in the same horizontal plane forming a two-dimensional distributed thrust array of four proprotor systems. As the longitudinal axis and the lateral axis of ducted aircraft 10 are both in the horizontal plane, ducted aircraft 10 has a level flight attitude. During hover, flight control computer 22 utilizes individual variable speed and blade pitch control capability of proprotor systems 20 to control flight dynamics to maintain hover stability and to provide pitch, roll and yaw authority for ducted aircraft 10. More specifically, as each proprotor system 20 is independently controllable, operational changes to certain proprotor systems 20 enable pitch, roll and yaw control of ducted aircraft 10 during VTOL operations.

For example, by changing the thrust output or collective pitch of the forward proprotor systems relative to the aft proprotor systems, pitch control is achieved. As another example, by changing the thrust output or collective pitch of the port proprotor systems relative to the starboard proprotor systems, roll control is achieved. Changing the relative thrust outputs of the various proprotor systems 20 may be accomplished using differential rotor speed control, that is, increasing the rotor speed of some proprotor systems relative to the rotor speed of other proprotor systems and/or decreasing the rotor speed of some proprotor systems relative to the rotor speed of other proprotor systems. Changing the relative thrust outputs of the various proprotor systems 20 may also be accomplished using collective blade pitch. Yaw control or torque balancing of ducted aircraft 10 during VTOL operations may be accomplished by changing the torque output of certain proprotor systems 20. For example, the forward-port and aft-starboard proprotor systems may have clockwise rotating proprotor assemblies while the forward-starboard and aft-port proprotor systems may have counterclockwise rotating proprotor assemblies. In this example, by changing the torque output of the forward-port and aft-starboard proprotor systems relative to the forward-starboard and aft-port proprotor systems, yaw control is achieved. Changing the relative torque outputs of the various proprotor systems 20 is preferably accomplished using differential rotor speed control. In the VTOL flight mode, flight control computer 22 sends commands to the actuators associated with adaptive geometry devices 32, 34, 36 to move adaptive geometry devices 32, 34, 36 into the hover position. In the hover position, the increased leading edge inner lip radius, chord length, and/or diffusion angle of each duct 28 improves thrust performance in the VTOL flight mode.

Returning to the sequential flight-operating scenario of ducted aircraft 10, after vertical ascent to the desired elevation, ducted aircraft 10 may begin the transition from thrust-borne lift to wing-borne lift. As best seen from the progression of FIGS. 4B-4D, the angular positions of proprotor systems 20 are changed by a pitch down rotation to transition ducted aircraft 10 from the VTOL flight mode toward the forward flight mode. As seen in FIG. 4C, proprotor systems 20 have been collectively inclined about 45 degrees pitch down. In the conversion orientations of ducted aircraft 10, a portion of the thrust generated by proprotor systems 20 provides lift while a portion of the thrust generated by proprotor systems 20 urges ducted aircraft 10 to accelerate in the forward direction such that the forward airspeed of ducted aircraft 10 increases allowing the wings of ducted aircraft 10 to offload a portion and eventually all of the lift requirement from proprotor systems 20. In the conversion flight mode shown in FIG. 4C, adaptive geometry devices 32, 34, 36 transition out of the hover position and into the cruise position responsive to commands from flight control computer 22.

Figure 4E:
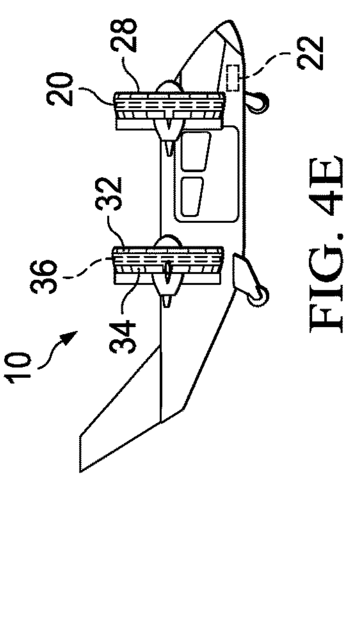

As best seen in FIGS. 4D-4E, proprotor systems 20 have been collectively inclined about 90 degrees pitch down such that the proprotor assemblies are rotating in vertical planes providing forward thrust for ducted aircraft 10 while the wings provide lift. Even though the conversion from the VTOL flight mode to the forward flight mode of ducted aircraft 10 has been described as progressing with collective pitch down rotation of proprotor systems 20, in other implementations, all proprotor systems 20 need not be operated at the same time or at the same rate. As forward flight with wing-borne lift requires significantly less thrust than VTOL flight with thrust-borne lift, the operating speed of some or all of proprotor systems 20 may be reduced particularly in embodiments having collective pitch control. In the forward flight mode, flight control computer 22 sends commands to the actuators associated with adaptive geometry devices 32, 34, 36 to move adaptive geometry devices 32, 34, 36 into the cruise position, shaping ducts 28 into thinner and/or shorter ducts with a smaller profile that reduces drag.

In certain embodiments, some of proprotor systems 20 of ducted aircraft 10 could be shut down during forward flight. In the forward flight mode, the independent rotor speed control provided by flight control computer 22 over each proprotor system 20 may provide yaw authority for ducted aircraft 10. For example, by changing the thrust output of either or both port proprotor systems relative to starboard proprotor systems, yaw control is achieved. Changing the relative thrust outputs of the various proprotor systems 20 may be accomplished using differential rotor speed control. Changing the relative thrust outputs of the various proprotor systems 20 may also be accomplished using collective pitch control. In the forward flight mode, pitch and roll authority is preferably provided by the ailerons and/or elevators on the wings and/or tail assembly of ducted aircraft 10.

Figure 4F:
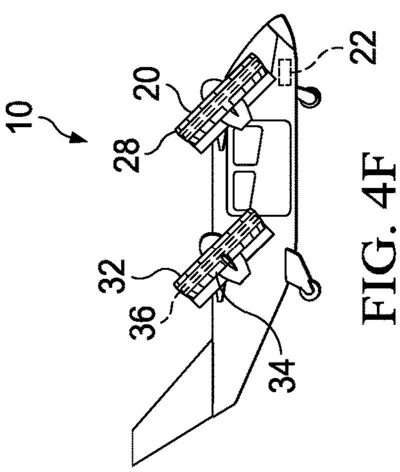
Figure 4G:
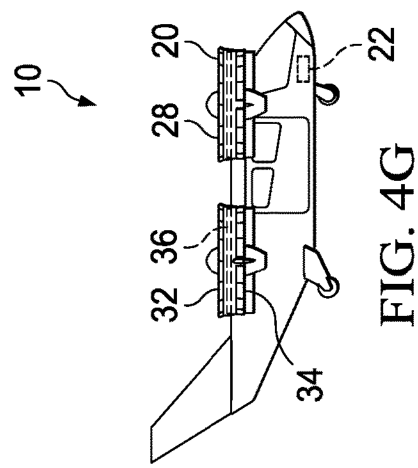
Figure 4H:
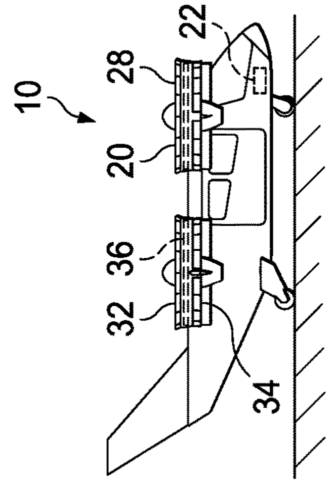

As ducted aircraft 10 approaches its destination, ducted aircraft 10 may begin its transition from wing-borne lift to thrust-borne lift. As best seen from the progression of FIGS. 4E-4G, the angular positions of proprotor systems 20 are changed by a pitch up rotation to transition ducted aircraft 10 from the forward flight mode toward the VTOL flight mode. As seen in FIG. 4F, proprotor systems 20 have been collectively inclined about 45 degrees pitch up. In the conversion orientations of ducted aircraft 10, a portion of the thrust generated by proprotor systems 20 begins to provide lift for ducted aircraft 10 as the forward airspeed decreases and the lift producing capability of the wings of ducted aircraft 10 decreases. As best seen in FIG. 4G, proprotor systems 20 have been collectively inclined about 90 degrees pitch up such that the proprotor assemblies are rotating in the horizontal plane providing thrust-borne lift for ducted aircraft 10. Even though the conversion from the forward flight mode to the VTOL flight mode of ducted aircraft 10 has been described as progressing with collective pitch up rotation of proprotor systems 20, in other implementations, all proprotor systems 20 need not be operated at the same time or at the same rate. As ducted aircraft 10 returns to the VTOL flight mode, flight control computer 22 sends commands to the actuators associated with adaptive geometry devices 32, 34, 36 to move adaptive geometry devices 32, 34, 36 back into the hover position, thereby changing the shape of ducts 28 for improved hover performance. Once ducted aircraft 10 has completed the transition to the VTOL flight mode, ducted aircraft 10 may commence its vertical descent to a surface. As best seen in FIG. 4H, ducted aircraft 10 has landed at the destination location.

Figure 5A:
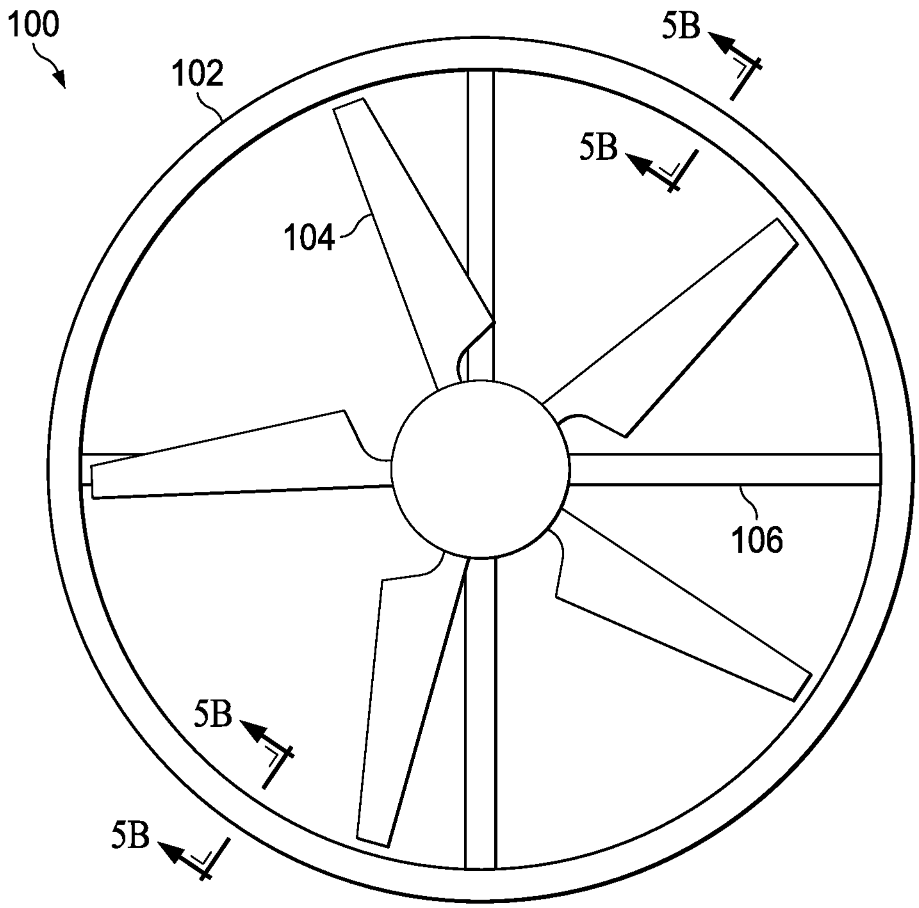
FIGS. 5A-5B are various views of static ducts used on previous aircraft.
Figure 5B:
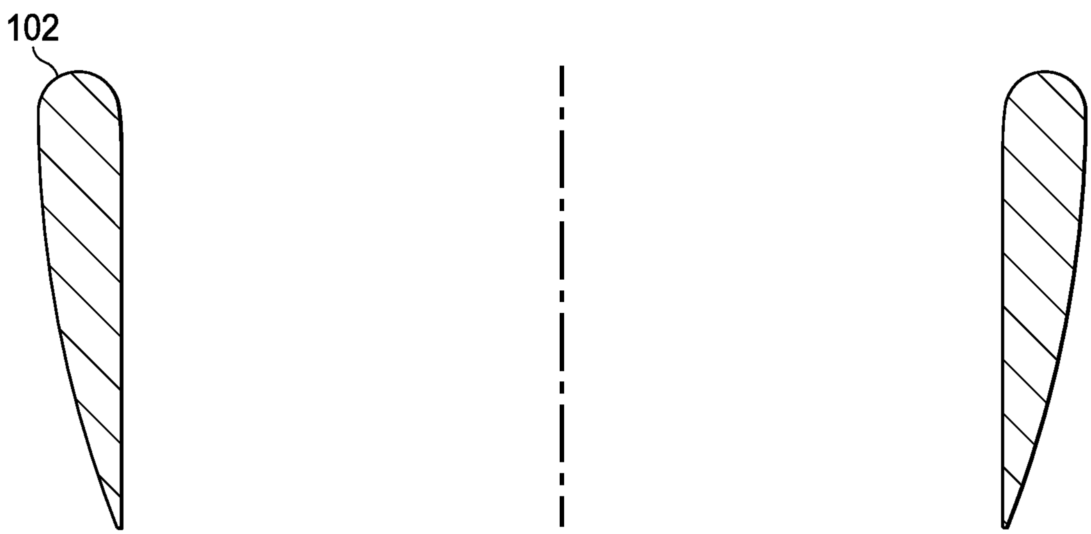

Referring to FIGS. 5A-5B in the drawings, a ducted proprotor system used on previous aircraft is schematically illustrated and generally designated 100. Proprotor system 100 includes duct 102, which surrounds proprotor blades 104 and is supported by stators 106. Duct 102 has a static shape that is incapable of changing geometry. Ducts of previous aircraft have typically been optimized for either hover operations or cruise operations. Previous ducts may also be shaped to compromise between the ideal hover duct shape and the ideal cruise duct shape, yielding degraded benefits in either flight mode. Regardless of the static shape chosen for duct 102, the performance of proprotor system 100 is degraded in some or all flight modes since duct 102 is unable to change shape to optimize performance in each flight mode. Such degraded performance leads to increased power requirements, which in turn lead to increased vehicle weight.

Referring to FIGS. 6A-6E in the drawings, proprotor system 200 includes duct 202 supported by stators 204 and surrounding proprotor blades 206. Duct 202 includes hinged noses 208 circumferentially disposed around the circumference of duct 202. Hinged noses 208 are leading edge adaptive geometry devices rotatably coupled to leading edge 210 of duct 202. While the illustrated embodiment shows sixteen hinged noses 208 coupled to leading edge 210 of duct 202, any number of hinged noses 208 may be disposed along leading edge 210 of duct 202. Also, while hinged noses 208 are shown as curved circular segments that contour the circumference of duct 202, hinged noses 208 may alternatively be flat to form a polygonal outline when viewed from the front view of FIG. 6C.

Figure 6A:
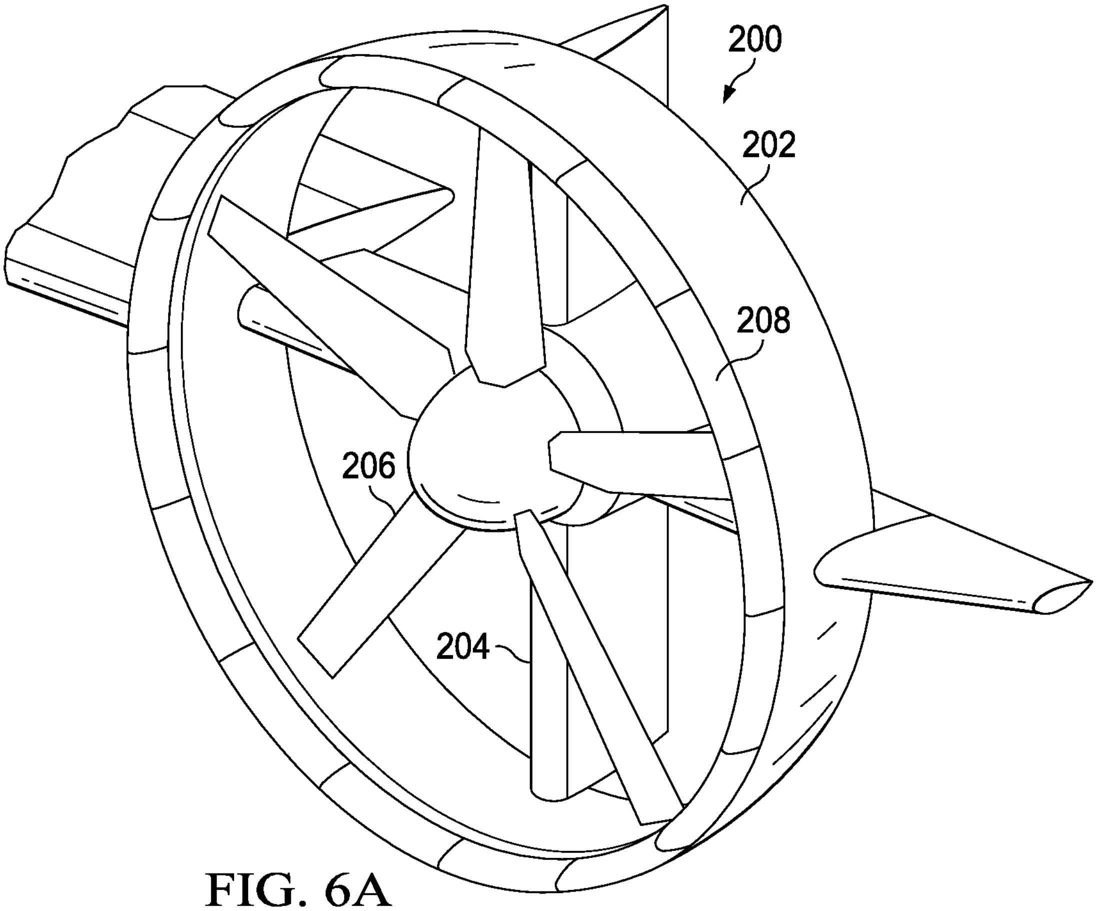
FIGS. 6A-6E are various views of a proprotor system with a duct having hinged noses in accordance with embodiments of the present disclosure.
Figure 6B:
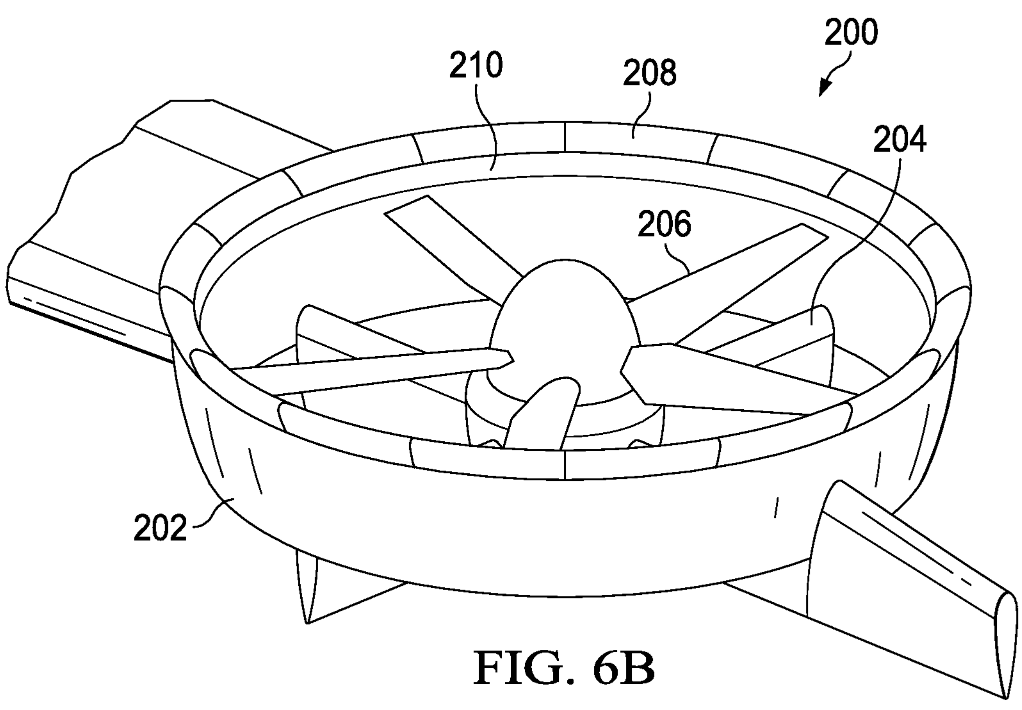
Figure 6D:
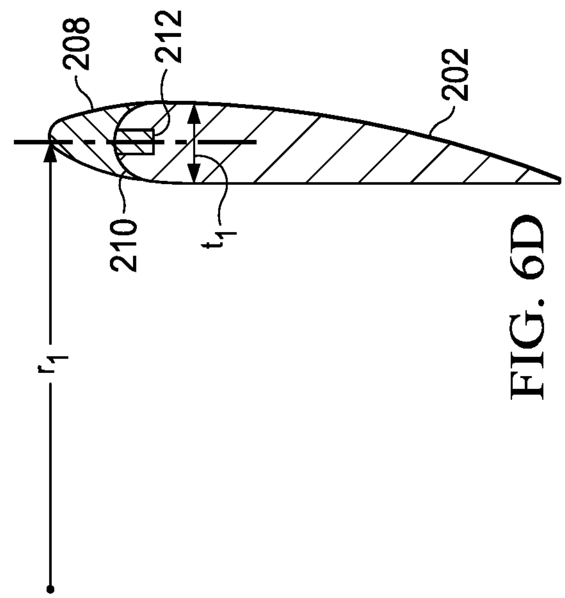
Figure 6E:
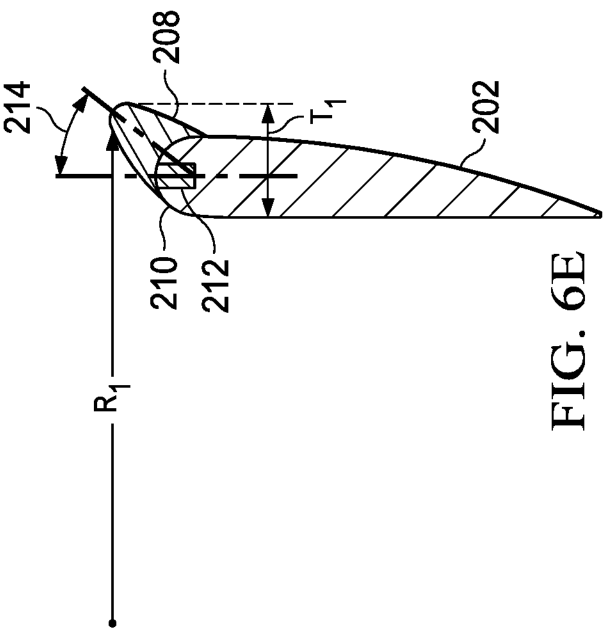
Figure 6C:
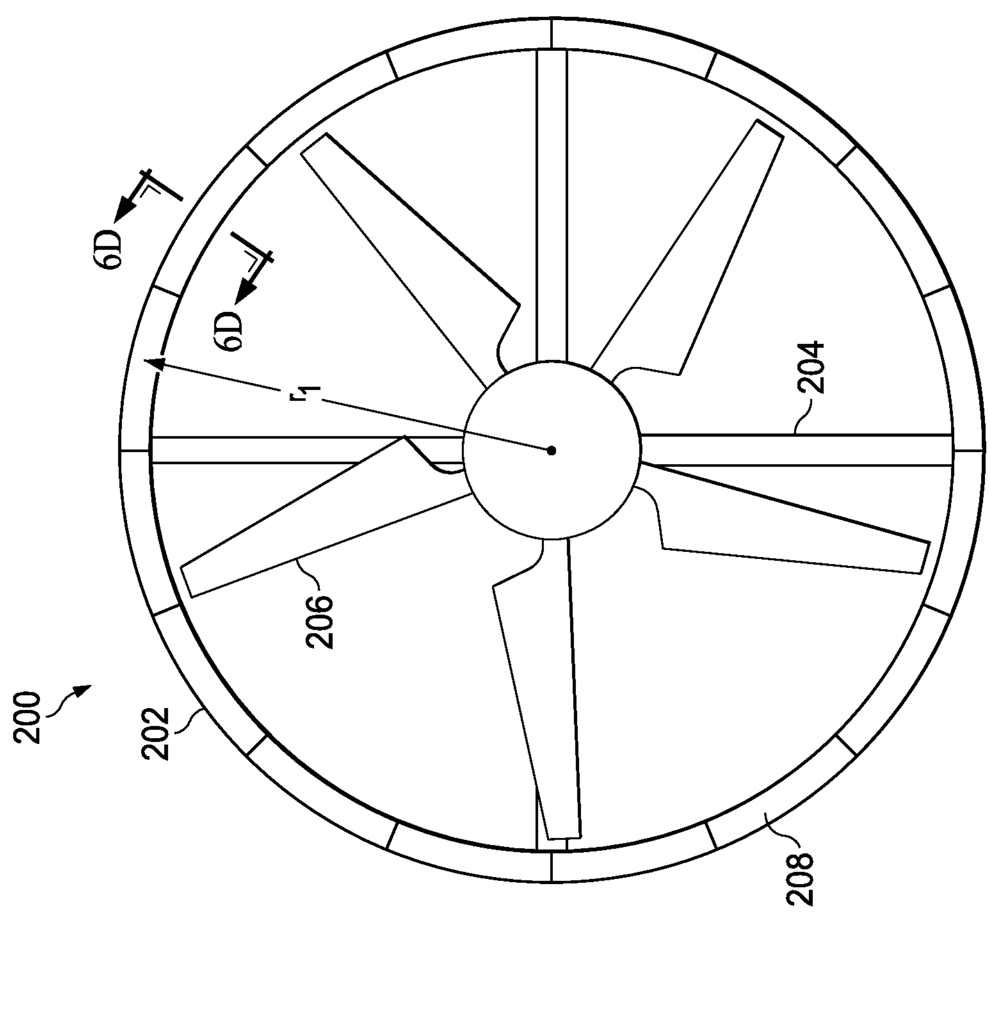

Proprotor system 200 includes actuators 212, each of which is coupled to a respective hinged nose 208. Actuators 212 move hinged noses 208 between a cruise position in the forward flight mode as shown in FIGS. 6A, 6C and 6D and a hover position in the VTOL flight mode as shown in FIGS. 6B and 6E. In the cruise position, as best seen in FIG. 6D, hinged noses 208 are in chordwise alignment with the remainder of duct 202 and point in the forward direction. In the hover position, as best seen in FIG. 6E, hinged noses 208 are tilted radially outward such that hinged noses 208 form an acute angle 214 with the remainder of duct 202 and are generally nonaligned with the remainder of duct 202. Tilting hinged noses 208 radially outward in this manner increases the leading edge inner lip radius $R_1$ of duct 202 in the hover position as compared to the smaller leading edge inner lip radius $r_1$ of duct 202 in the cruise position. The larger leading edge inner lip radius $R_1$ from the center of duct 202 to hinged noses 208 in the hover position is more efficient in hover conditions at least in part because the leading edge inner lip of duct 202 "guides" air into duct 202 from over the edges and sides of duct 202. Hinged noses 208 alter the geometry of duct 202 in other ways as well. For example, thickness $t_1$ of duct 202 in the cruise position is less than thickness $T_1$ of duct 202 in the hover position so that duct 202 causes less drag in the forward flight mode.

Referring to FIGS. 7A-7E in the drawings, proprotor system 300 includes duct 302 supported by stators 304 and surrounding proprotor blades 306. Duct 302 includes Krueger flaps, or slats, 308 circumferentially disposed around the circumference of duct 302. Krueger flaps 308 are leading edge adaptive geometry devices rotatably coupled to leading edge 310 of duct 302. While the illustrated embodiment shows sixteen Krueger flaps 308 coupled to leading edge 310 of duct 302, any number of Krueger flaps 308 may be disposed along leading edge 310 of duct 302.

Figure 7A:
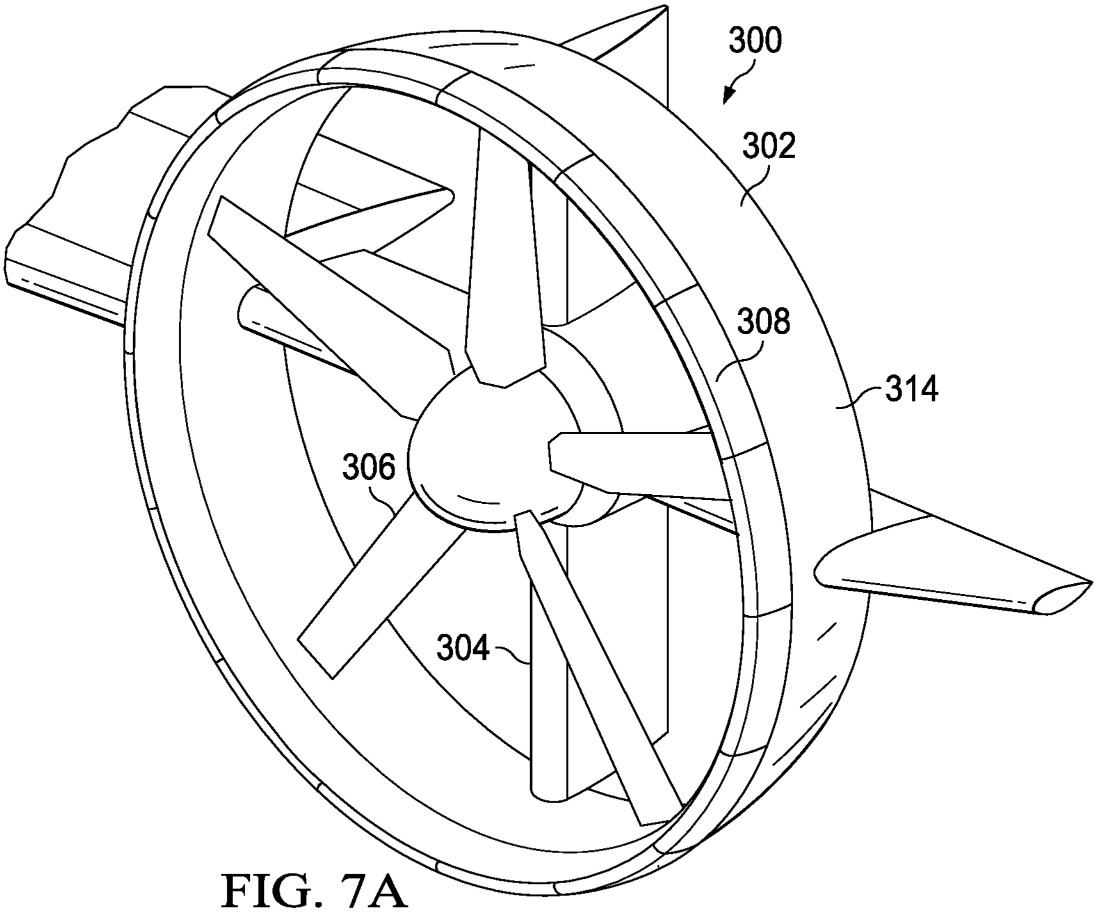
FIGS. 7A-7E are various views of a proprotor system with a duct having Krueger flaps in accordance with embodiments of the present disclosure.
Figure 7B:
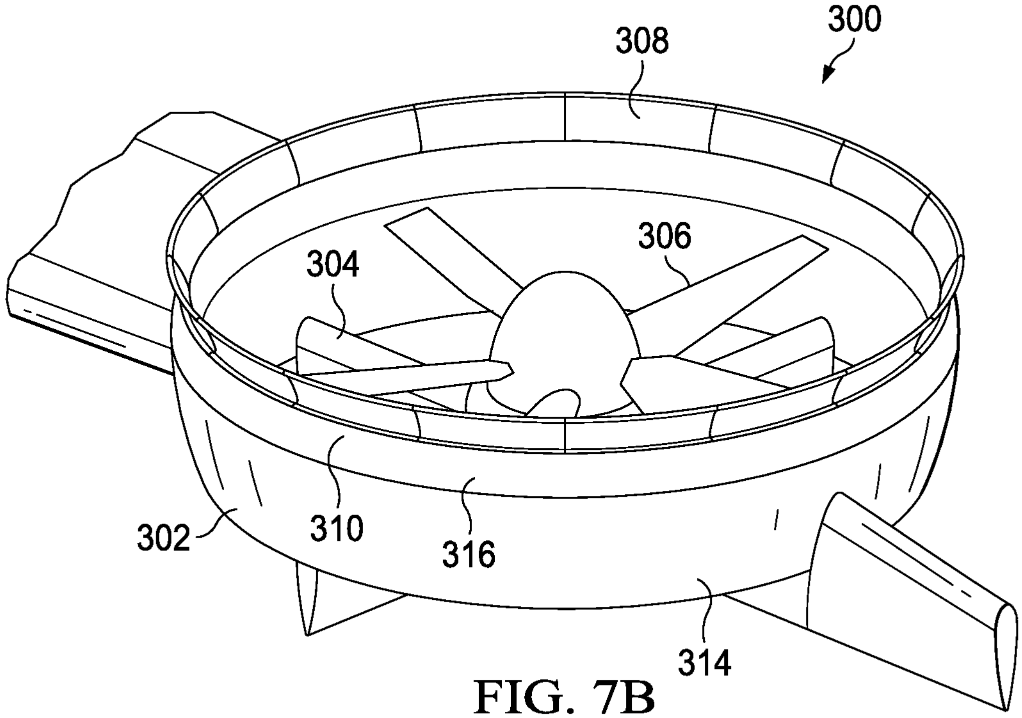
Figure 7D:
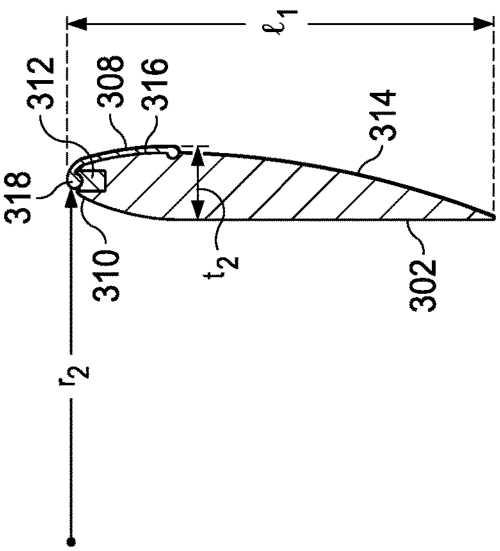
Figure 7E:
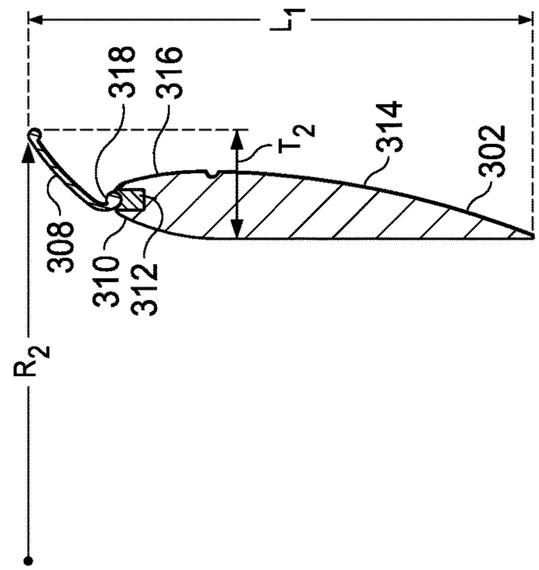
Figure 7C:
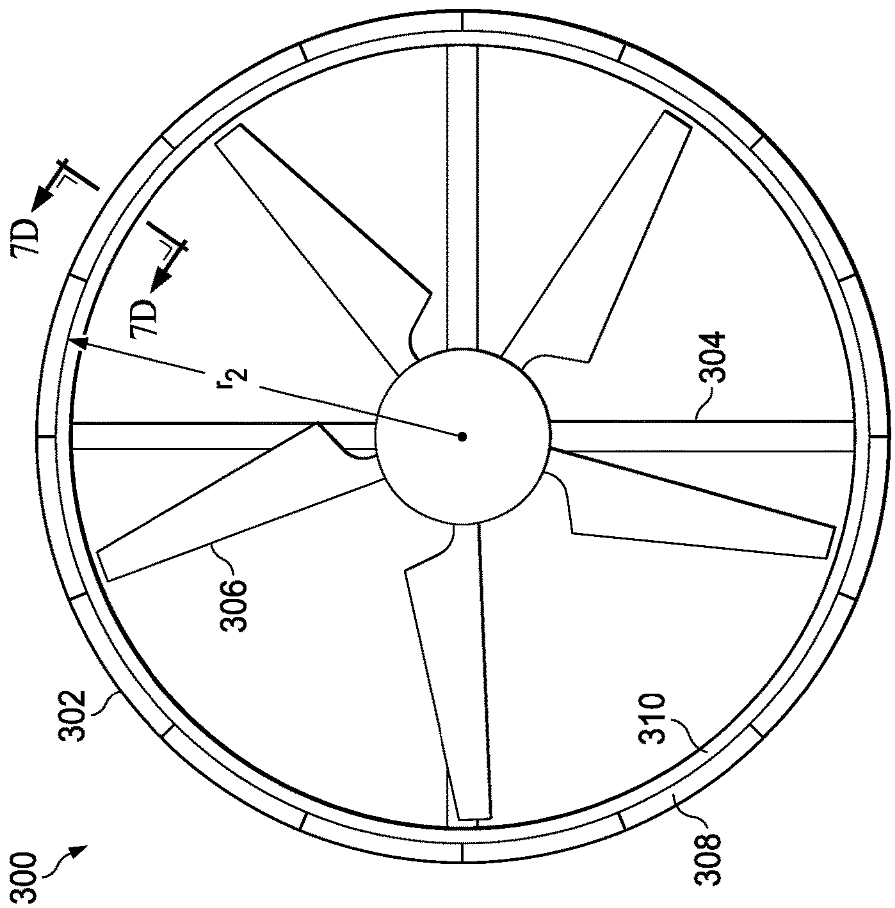

Proprotor system 300 includes actuators 312, each of which is coupled to a respective Krueger flap 308. Actuators 312 move Krueger flaps 308 between a cruise position in the forward flight mode as shown in FIGS. 7A, 7C and 7D and a hover position in the VTOL flight mode as shown in FIGS. 7B and 7E. In the cruise position, Krueger flaps 308 are retracted against outer surface 314 of duct 302, which forms an indent 316 to receive Krueger flaps 308 in the retracted position. As best seen in FIG. 7D, Krueger flaps 308 are shaped to contour outer surface 314 of duct 302. Each Krueger flap 308 is rotatably coupled to leading edge 310 of duct 302 by a hinge 318. When Krueger flaps 308 rotate into the hover position about hinge 318, as best seen in FIG. 7E, Krueger flaps 308 extend radially outward and forward of leading edge 310 of duct 302. Rotating Krueger flaps 308 radially outward in this manner increases the leading edge inner lip radius $R_2$ of duct 302 in the hover position as compared to the smaller leading edge inner lip radius $r_2$ of duct 302 in the cruise position, improving hover thrust efficiency. Krueger flaps 308 alter the geometry of duct 302 in other ways as well. For example, thickness $t_2$ of duct 302 in the cruise position is less than thickness $T_2$ of duct 302 in the hover position so that duct 302 causes less drag in the forward flight mode. In addition, chord length $L_1$ of duct 302 in the hover position is greater than chord length $l_1$ of duct 302 in the cruise position. Increasing chord length $L_1$ of duct 302 in the hover position improves hover thrust performance.

Referring to FIGS. 8A-8E in the drawings, proprotor system 400 includes duct 402 supported by stators 404 and surrounding proprotor blades 406. Duct 402 includes plain flaps 408 circumferentially disposed around the circumference of duct 402. Plain flaps 408 are trailing edge adaptive geometry devices rotatably coupled to trailing edge 410 of duct 402. While the illustrated embodiment shows sixteen plain flaps 408 coupled to trailing edge 410 of duct 402, any number of plain flaps 408 may be disposed along trailing edge 410 of duct 402.

Figure 8A:
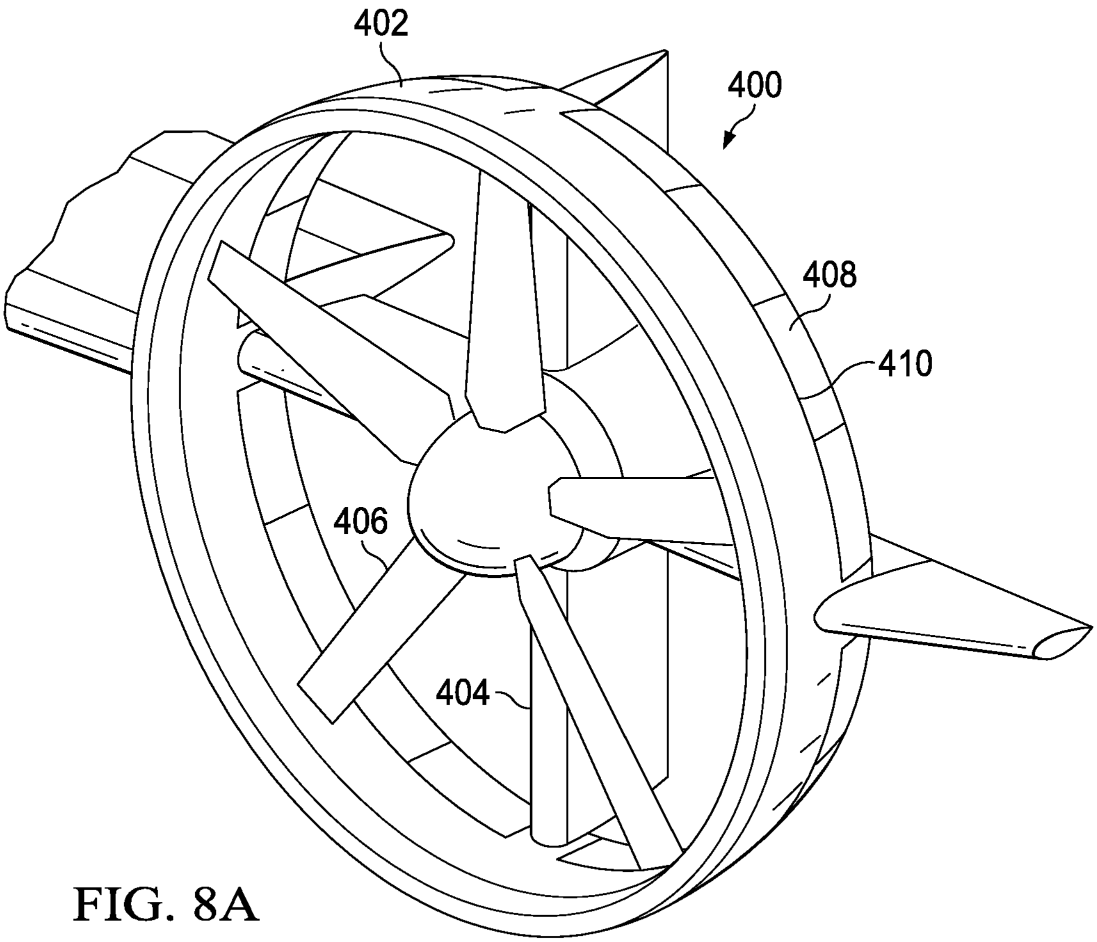
FIGS. 8A-8E are various views of a proprotor system with a duct having plain flaps in accordance with embodiments of the present disclosure.
Figure 8B:
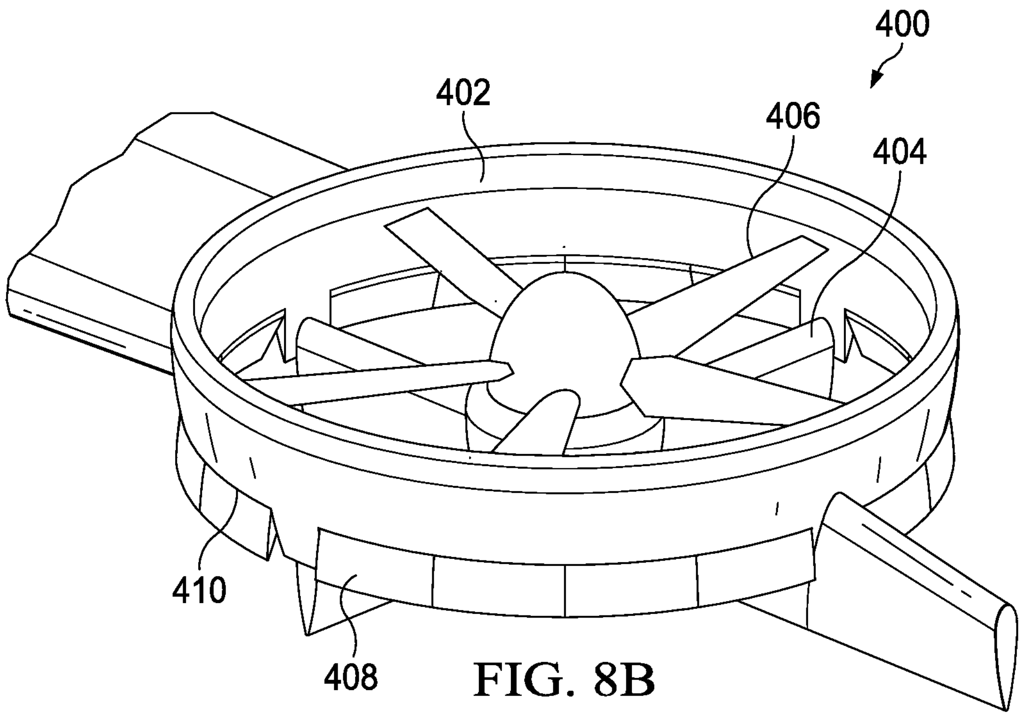
Figure 8C:
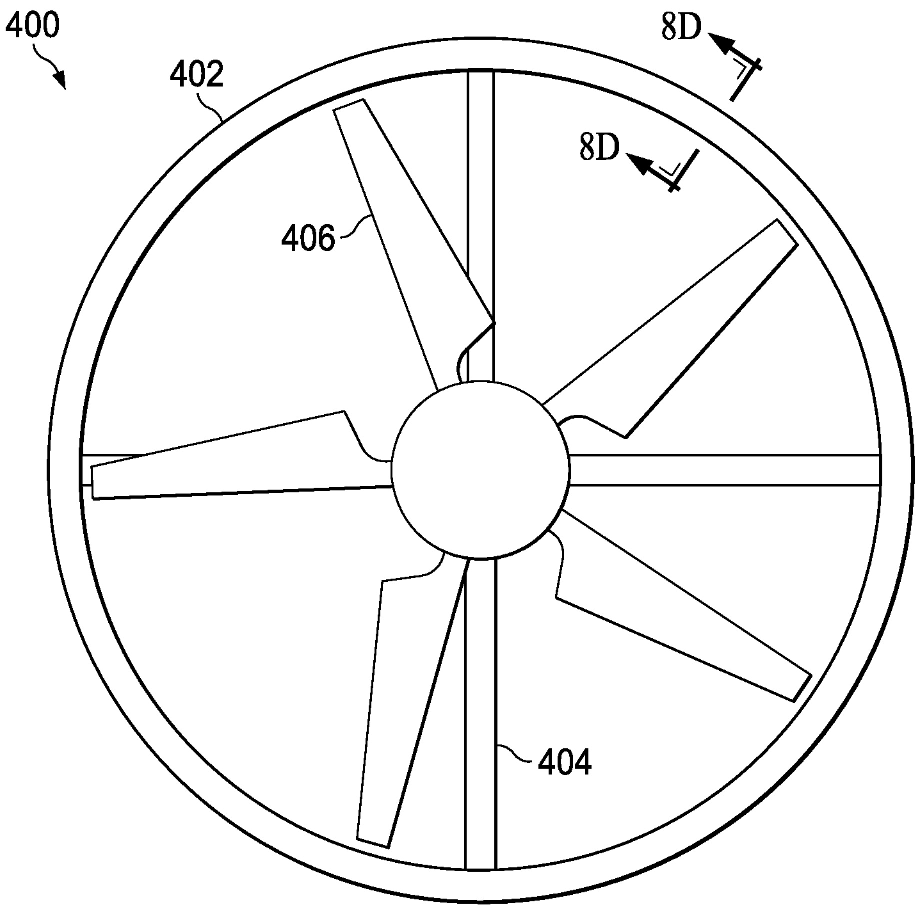
Figure 8D:
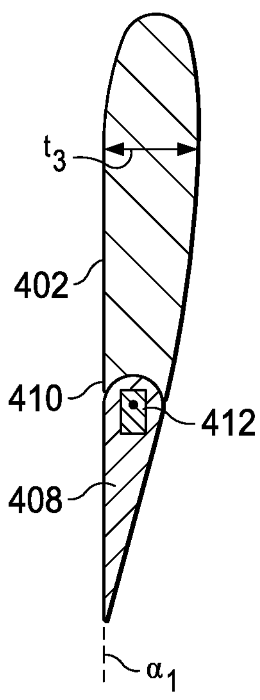
Figure 8E:
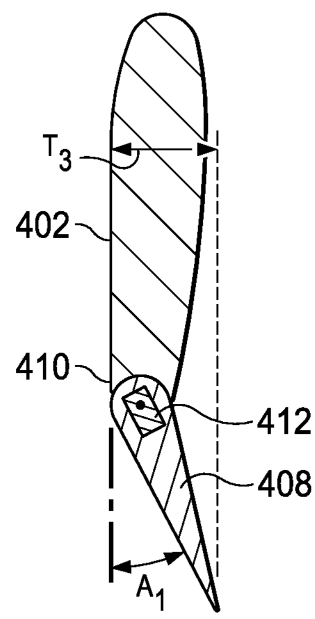

Proprotor system 400 includes actuators 412, each of which is coupled to a respective plain flap 408. Actuators 412 move plain flaps 408 between a cruise position in the forward flight mode as shown in FIGS. 8A, 8C and 8D and a hover position in the VTOL flight mode as shown in FIGS. 8B and 8E. In the cruise position, as best seen in FIG. 8D, plain flaps 408 are in chordwise alignment with the remainder of duct 402 and point in the aft direction. In the hover position, as best seen in FIG. 8E, plain flaps 408 are tilted radially outward such that plain flaps 408 form an acute angle $A_1$ with the remainder of duct 402 and are generally nonaligned with the remainder of duct 402. Tilting plain flaps 408 radially outward in this manner increases diffusion angle $A_1$ of duct 402 in the hover position as compared to the smaller diffusion angle $\alpha_1$ of duct 402 in the cruise position. Diffusion angle $\alpha_1$ of duct 402 in the cruise position is at or near zero degrees. The larger diffusion angle $A_1$ in the hover position is more efficient in hover conditions at least in part due to the increased expansion ratio of duct 402 caused by the coanda effect. Plain flaps 408 alter the geometry of duct 402 in other ways as well. For example, thickness $t_3$ of duct 402 in the cruise position is less than thickness $T_3$ of duct 402 in the hover position so that duct 402 causes less drag in the forward flight mode.

Referring to FIGS. 9A-9E in the drawings, proprotor system 500 includes duct 502 supported by stators 504 and surrounding proprotor blades 506. Duct 502 includes Fowler flaps 508 circumferentially disposed around the circumference of duct 502. Fowler flaps 508 are trailing edge adaptive geometry devices slidably coupled to trailing edge 510 of duct 502. Additionally, Fowler flaps 508 may be rotatably coupled to trailing edge 510 of duct 502. While the illustrated embodiment shows sixteen Fowler flaps 508 coupled to trailing edge 510 of duct 502, any number of Fowler flaps 508 may be disposed along trailing edge 510 of duct 502.

Figure 9A:
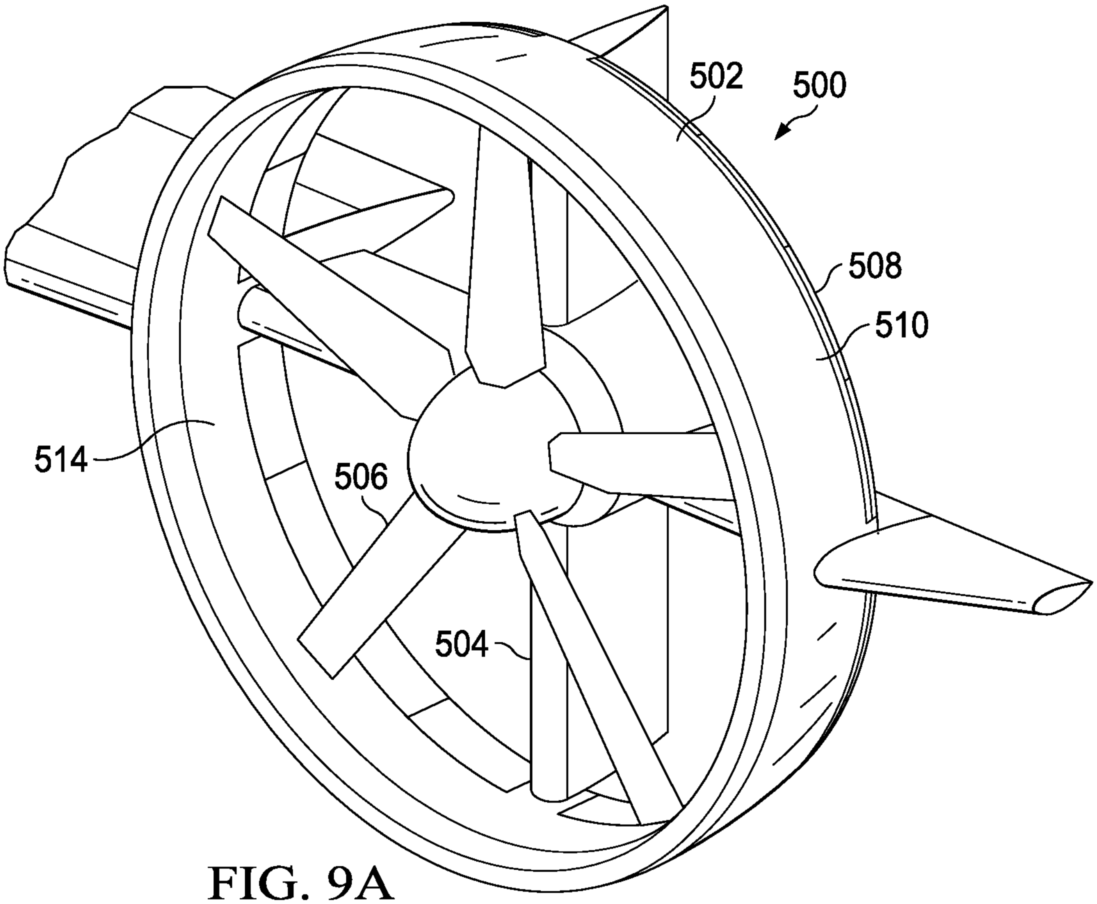
FIGS. 9A-9E are various views of a proprotor system with a duct having Fowler flaps in accordance with embodiments of the present disclosure.
Figure 9B:
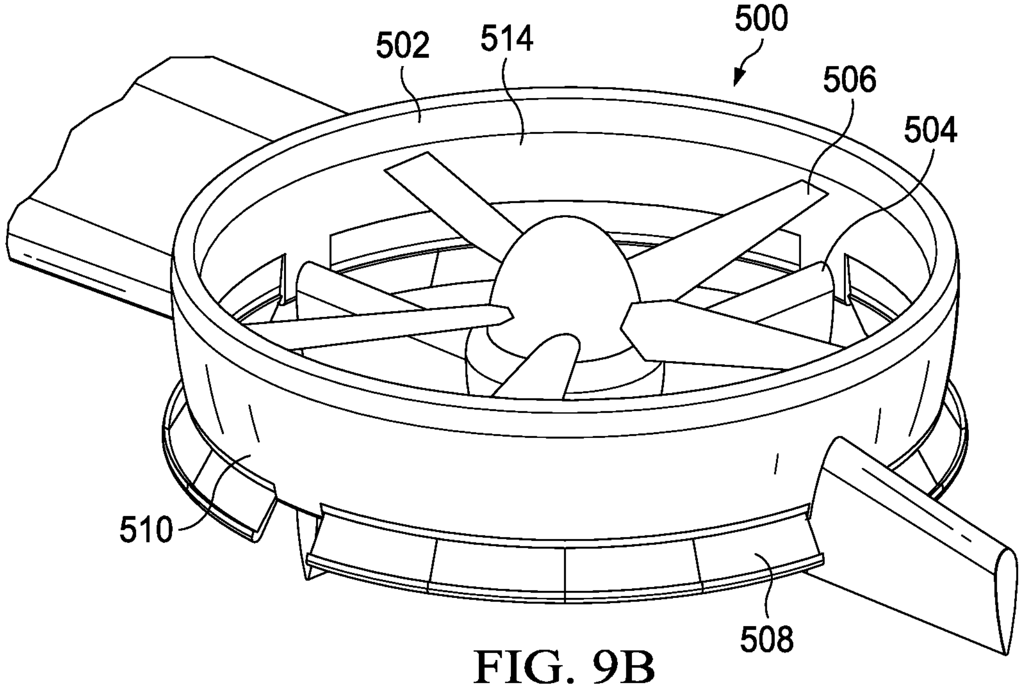
Figure 9C:
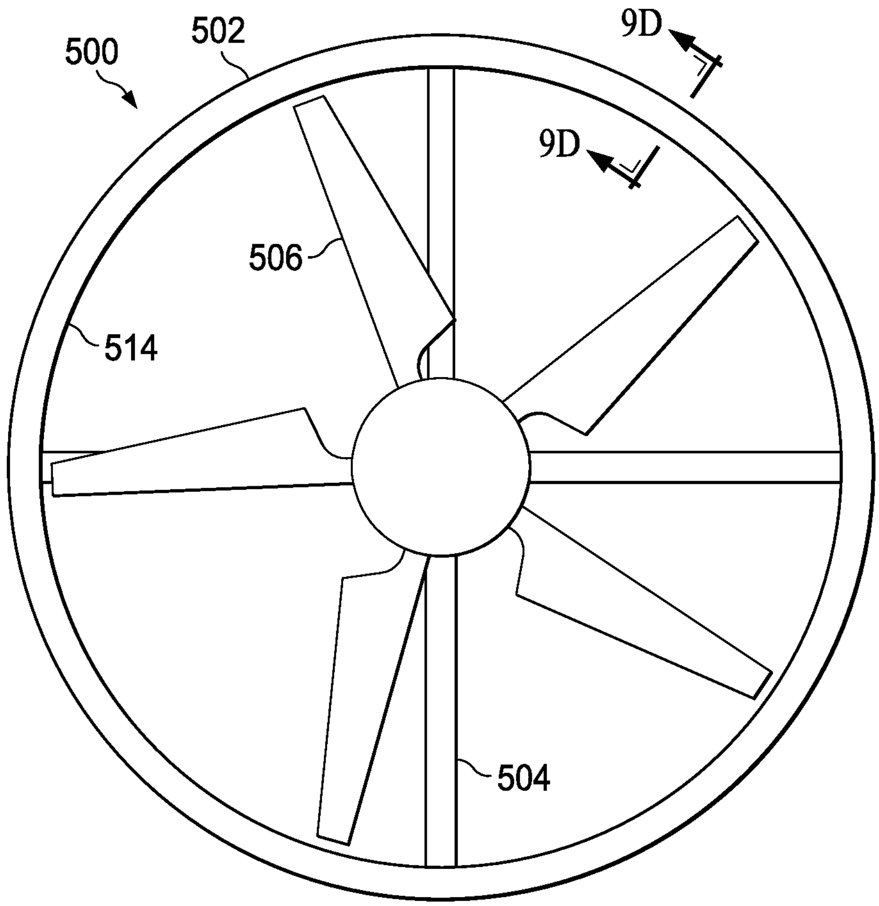
Figure 9D:
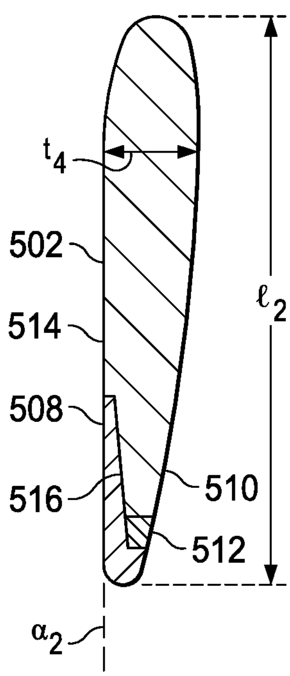
Figure 9E:
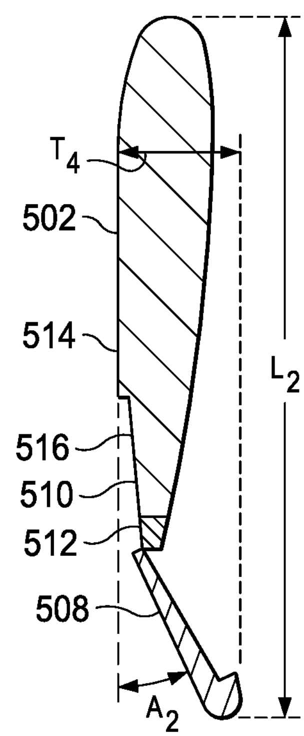

Proprotor system 500 includes actuators 512, each of which is coupled to a respective Fowler flap 508. Actuators 512 move Fowler flaps 508 between a cruise position in the forward flight mode as shown in FIGS. 9A, 9C and 9D and a hover position in the VTOL flight mode as shown in FIGS. 9B and 9E. In the cruise position, Fowler flaps 508 are retracted against an inner surface 514 of duct 502, which forms indents 516 to receive Fowler flaps 508 in the retracted position. In other embodiments, Fowler flaps 508 may retract against the outer surface of duct 502 in the cruise position. In the hover position, Fowler flaps 508 are extended aftward and radially outward such that Fowler flaps 508 form an acute angle $A_2$ with the remainder of duct 502. Tilting Fowler flaps 508 radially outward in this manner increases diffusion angle $A_2$ of duct 502 in the hover position as compared to the smaller diffusion angle $\alpha_2$ of duct 502 in the cruise position. Diffusion angle $\alpha_2$ of duct 502 in the cruise position is at or near zero degrees. The larger diffusion angle $A_2$ in the hover position is more efficient in hover conditions at least in part due to the increased expansion ratio of duct 502 caused by the coanda effect. Fowler flaps 508 alter the geometry of duct 502 in other ways as well. For example, thickness $t_4$ of duct 502 in the cruise position is less than thickness $T_4$ of duct 502 in the hover position so that duct 502 causes less drag in the forward flight mode. In addition, chord length $L_2$ of duct 502 in the hover position is greater than chord length $l_2$ of duct 502 in the cruise position. Increasing chord length $L_2$ of duct 502 in the hover position improves hover thrust performance.

Referring to FIGS. 10A-10E in the drawings, proprotor system 600 includes duct 602 supported by stators 604 and surrounding proprotor blades 606. Duct 602 includes a forward duct airframe 608 and tail extensions 610. Duct 602 also includes elongating adaptive geometry devices 612 circumferentially disposed around the circumference of duct 602. Elongating adaptive geometry devices 612 are intermediate adaptive geometry devices disposed between the leading and trailing edges of duct 602. Elongating adaptive geometry devices 612 slidably couple tail extensions 610 to forward duct airframe 608. While the illustrated embodiment shows four elongating adaptive geometry devices 612, any number of elongating adaptive geometry devices 612 may be included in duct 602 and the number of elongating adaptive geometry devices 612 may or may not correspond to the number of tail extensions 610.

Figure 10A:
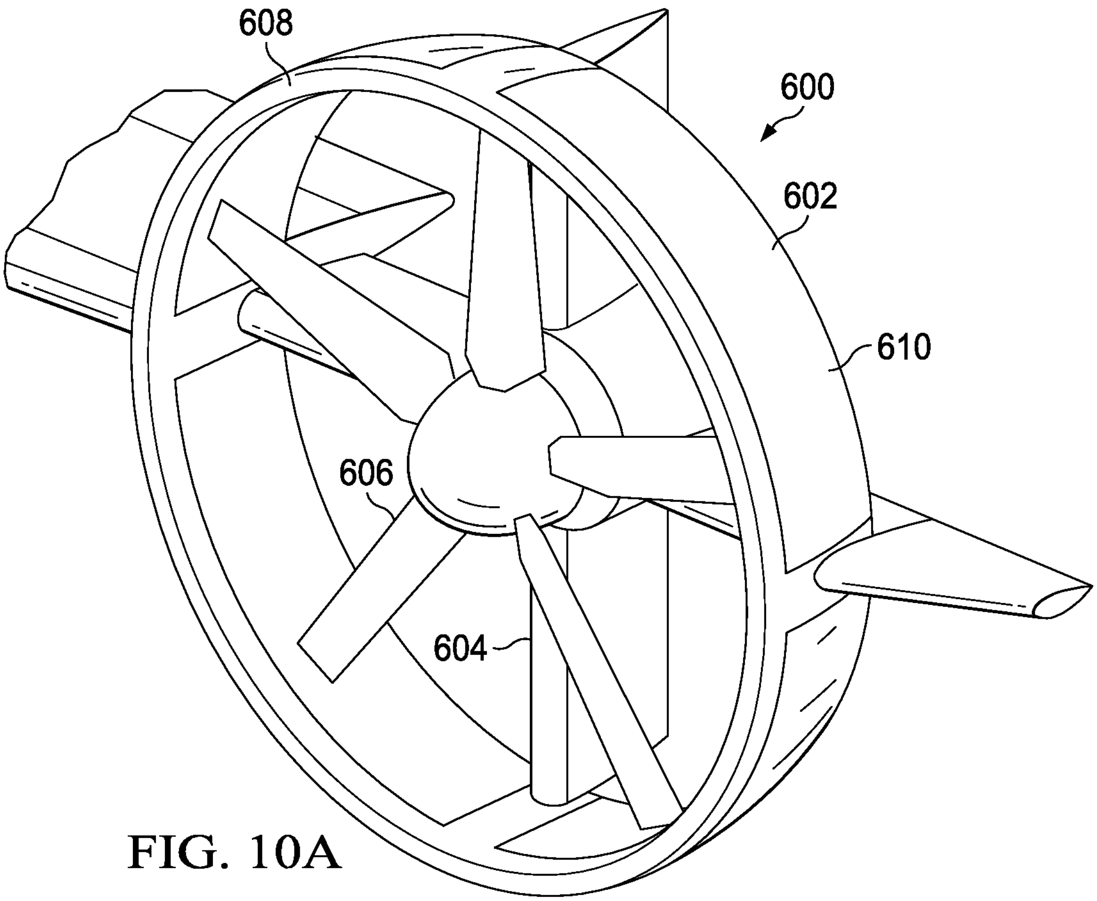
FIGS. 10A-10E are various views of a proprotor system with a duct having elongating adaptive geometry devices in accordance with embodiments of the present disclosure.
Figure 10B:
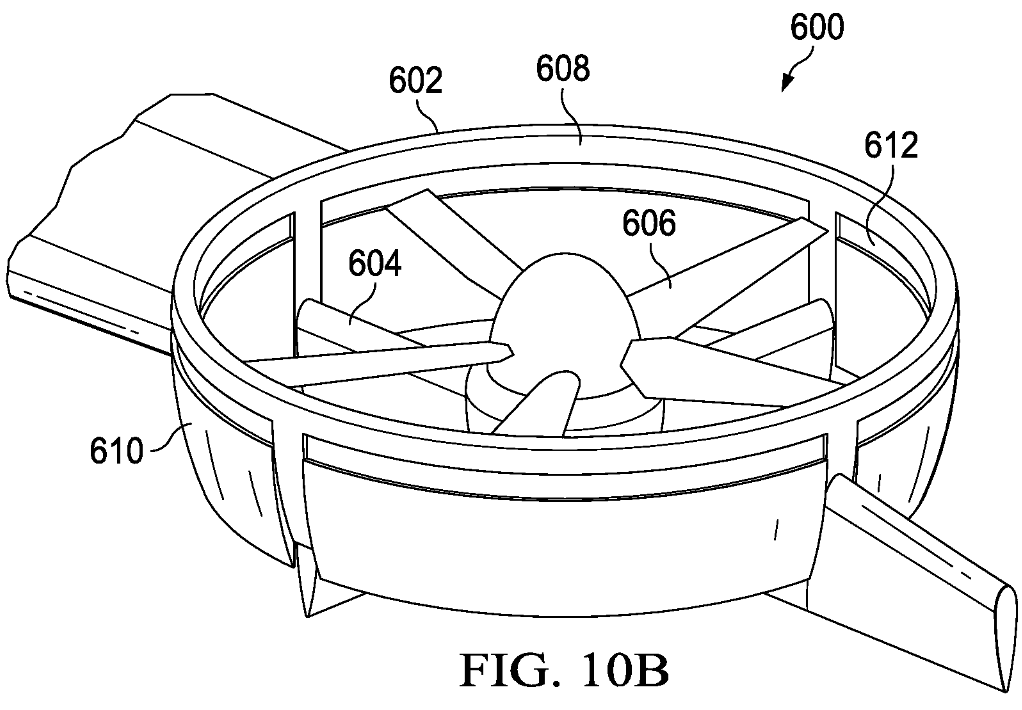
Figure 10C:
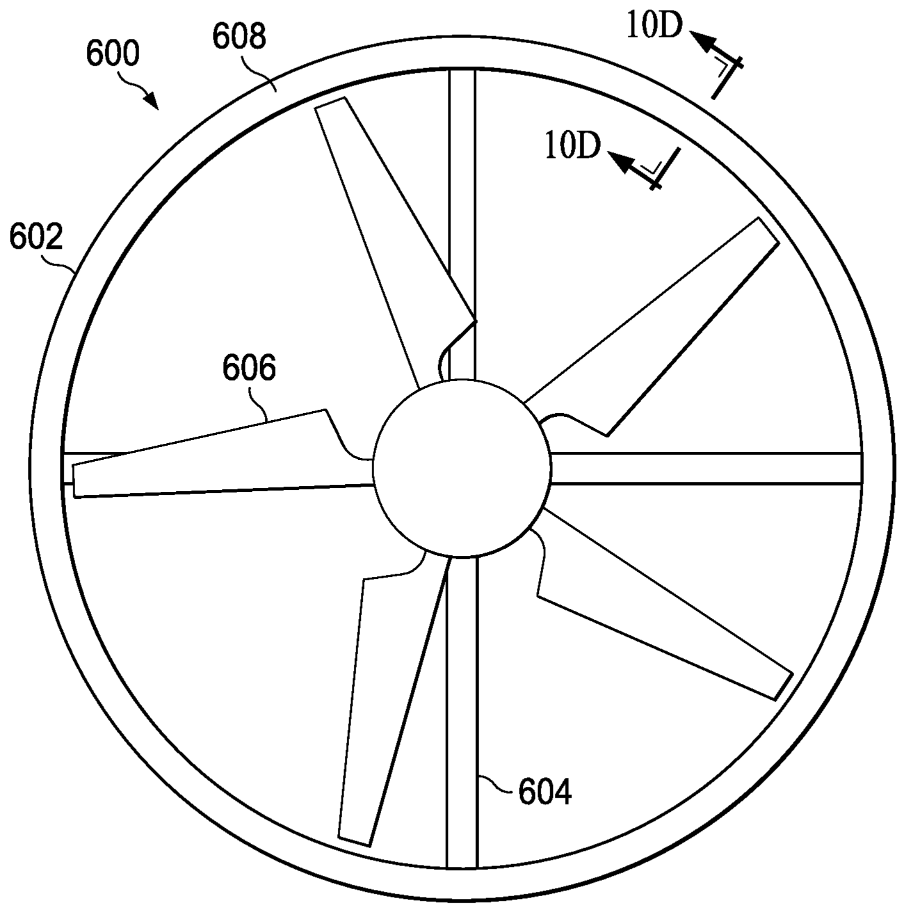
Figure 10D:
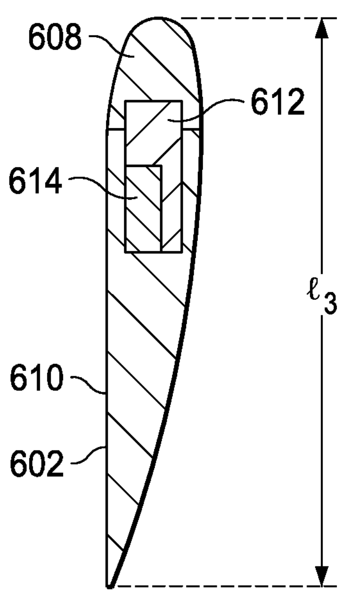
Figure 10E:
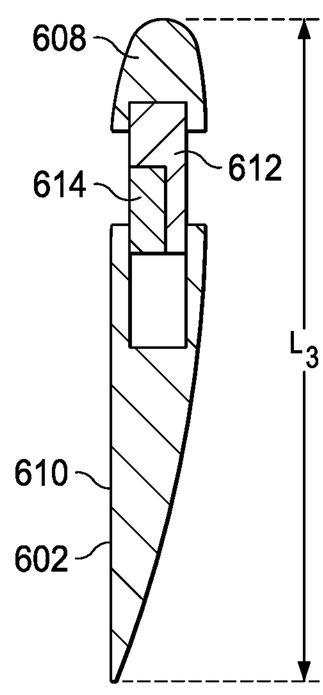

Elongating adaptive geometry devices 612 include actuators 614. Actuators 614 retract tail extensions 610 to forward duct airframe 608 in the cruise position of the forward flight mode as shown in FIGS. 10A, 10C and 10D and extend tail extensions 610 in the aft direction away from forward duct airframe 608 in the hover position of the VTOL flight mode as shown in FIGS. 10B and 10E. Chord length $L_3$ of duct 602 in the hover position is greater than chord length $l_3$ of duct 602 in the cruise position. Increasing chord length $L_3$ of duct 602 in the hover position improves hover thrust performance. In one non-limiting example, chord length $L_3$ in the hover position may be 30 to 60 percent longer than chord length $l_3$ in the cruise position such as between 50 to 60 percent longer.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor system for a ducted aircraft convertible between a vertical takeoff and landing flight mode and a forward flight mode comprising:

a plurality of proprotor blades;

a duct surrounding the proprotor blades and including an adaptive geometry device movable into a plurality of positions including a hover position and a cruise position, the adaptive geometry device comprising leading edge adaptive geometry devices including a plurality of hinged noses slidably coupled to a leading edge of the duct, the hinged noses substantially in chordwise alignment with the duct in the cruise position and tilted radially outward to increase a leading edge inner lip radius of the duct in the hover position; and one or more actuators coupled to the adaptive geometry device;

wherein, the hinged noses are slidable along the leading edge of the duct to move between the hover position and the cruise position; and wherein, the one or more actuators are configured to move the adaptive geometry device between the hover position and the cruise position based on the flight mode of the ducted aircraft, thereby improving flight performance of the ducted aircraft.

2. The proprotor system as recited in claim 1 wherein the duct forms a shape and movement of the adaptive geometry device between the hover position and the cruise position changes the shape of the duct.

3. The proprotor system as recited in claim 1 wherein the adaptive geometry device further comprises a trailing edge adaptive geometry device coupled to a trailing edge of the duct.

4. The proprotor system as recited in claim 3 wherein the trailing edge adaptive geometry device further comprises a plurality of plain flaps rotatably coupled to the trailing edge of the duct; and wherein, the plain flaps are substantially in chordwise alignment with the duct in the cruise position and tilted radially outward to increase a diffusion angle of the duct in the hover position.

5. The proprotor system as recited in claim 3 wherein the trailing edge adaptive geometry device further comprises a plurality of Fowler flaps slidably coupled to the trailing edge of the duct; and wherein, the Fowler flaps are retracted against an inner surface of the duct in the cruise position and extended aftward and radially outward to increase a diffusion angle of the duct in the hover position.

6. The proprotor system as recited in claim 1 wherein the adaptive geometry device further comprises an intermediate adaptive geometry device disposed between leading and trailing edges of the duct.

7. The proprotor system as recited in claim 6 wherein the duct further comprises a plurality of tail extensions and a forward duct airframe and the intermediate adaptive geometry device further comprises a plurality of elongating adaptive geometry devices slidably coupling the tail extensions to the forward duct airframe.

8. The proprotor system as recited in claim 7 wherein the elongating adaptive geometry devices extend the tail extensions in an aft direction in the hover position and retract the tail extensions toward the forward duct airframe in the cruise position.

9. The proprotor system as recited in claim 1 wherein the adaptive geometry device further comprises a plurality of adaptive geometry devices circumferentially disposed around a circumference of the duct.

10. The proprotor system as recited in claim 1 wherein the adaptive geometry device further comprises a plurality of adaptive geometry devices and the one or more actuators further comprise a plurality of actuators, each actuator coupled to a respective one of the adaptive geometry devices.

11. The proprotor system as recited in claim 1 wherein the one or more actuators move the adaptive geometry device into the hover position in the vertical takeoff and landing flight mode and the cruise position in the forward flight mode.

12. A ducted aircraft comprising:

a fuselage;

a proprotor system coupled to the fuselage, the proprotor system comprising:

a plurality of proprotor blades;

a duct surrounding the proprotor blades and including an adaptive geometry device movable into a plurality of positions including a hover position and a cruise position, the adaptive geometry device comprising leading edge adaptive geometry devices including a plurality of hinged noses slidably coupled to a leading edge of the duct, the hinged noses substantially in chordwise alignment with the duct in the cruise position and tilted radially outward to increase a leading edge inner lip radius of the duct in the hover position; and one or more actuators coupled to the adaptive geometry device;

wherein, the ducted aircraft is convertible between a vertical takeoff and landing flight mode and a forward flight mode;

wherein, the hinged noses are slidable along the leading edge of the duct to move between the hover position and the cruise position; and wherein, the one or more actuators are configured to move the adaptive geometry device between the hover position and the cruise position based on the flight mode of the ducted aircraft, thereby improving flight performance of the ducted aircraft.

13. The ducted aircraft as recited in claim 12 wherein the duct has a leading edge inner lip radius R when the adaptive geometry device is in the hover position and a leading edge inner lip radius r when the adaptive geometry device is in the cruise position; and wherein, R>r.

14. The ducted aircraft as recited in claim 12 wherein the duct has a chord length L when the adaptive geometry device is in the hover position and a chord length l when the adaptive geometry device is in the cruise position; and wherein, L>l.

15. The ducted aircraft as recited in claim 12 wherein the duct has a diffusion angle A when the adaptive geometry device is in the hover position and a diffusion angle α when the adaptive geometry device is in the cruise position; and wherein, A>α.

16. The ducted aircraft as recited in claim 12 wherein the duct has a thickness T when the adaptive geometry device is in the hover position and a thickness t when the adaptive geometry device is in the cruise position; and wherein, T>t.

17. The ducted aircraft as recited in claim 12 further comprising a flight control computer including a duct geometry controller configured to detect the flight mode of the ducted aircraft and send one or more commands to the one or more actuators to move the adaptive geometry device based on the flight mode of the ducted aircraft.

18. The proprotor system as recited in claim 1 wherein aft ends of the hinged noses form curved surfaces contouring a curved leading edge of the duct.

19. The proprotor system as recited in claim 1 wherein aft ends of the hinged noses form concave surfaces and the leading edge of the duct forms a convex surface complementary to the aft concave surfaces of the hinged noses.

* * * * *